(12) United States Patent  
Haughton et al.

(10) Patent No.: US 7,029,166 B2
(45) Date of Patent: *Apr. 18, 2006

(54) MIXING APPARATUS

(75) Inventors: Gary Haughton, Oakville (CA); Martin Behr, Oakville (CA); Tom Ostrowski, Mississauga (CA)

(73) Assignee: Enersave Fluid Mixers Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/711,279

(22) Filed: Sep. 7, 2004

(65) Prior Publication Data

US 2005/0174883 A1 Aug. 11, 2005

Related U.S. Application Data

(63) Continuation of application No. 10/294,563, filed on Nov. 15, 2002, now Pat. No. 6,830,369, which is a continuation-in-part of application No. PCT/CA02/00528, filed on Apr. 17, 2002.

(51) Int. Cl.
*B01F 11/00* (2006.01)
(52) U.S. Cl. ...................... 366/316; 366/332
(58) Field of Classification Search ............. 366/332, 366/315, 316, 256, 258, 260
See application file for complete search history.

(56) References Cited

U.S. PATENT DOCUMENTS

| 52,890 A | 2/1866 | Ryerson |
|---|---|---|
| 567,503 A | 9/1896 | Pelatan et al. |
| 1,345,312 A | 6/1920 | Blake |
| 1,408,596 A | 3/1922 | Heinrich |
| 2,064,402 A | 12/1936 | Bannister et al. |
| 2,557,503 A | 6/1951 | Hogaboom, Jr. |
| 2,615,692 A | 10/1952 | Muller |
| 2,661,938 A | 12/1953 | Kuentzel et al. |
| 3,214,148 A | 10/1965 | Thomas |
| 3,560,366 A | 2/1971 | Fisher |
| 3,912,237 A | 10/1975 | Ostberg et al. |
| 4,054,503 A | 10/1977 | Higgins |
| 4,125,439 A | 11/1978 | Fleischmann et al. |
| 4,169,681 A | 10/1979 | Kato |
| 4,189,362 A | 2/1980 | Dotson |
| 4,302,318 A | 11/1981 | Mock |
| 4,319,971 A | 3/1982 | Good et al. |

(Continued)

FOREIGN PATENT DOCUMENTS

DE 7416500 8/1974

(Continued)

OTHER PUBLICATIONS

Turner, J.S. Intermittent Release of Smoke from Chimneys. Journal of Mechanical Engineering Science 1960, vol. 2, No. 2, pp. 97-100.

(Continued)

*Primary Examiner*—Tony G. Soohoo
(74) *Attorney, Agent, or Firm*—Patrick J. Hofbauer

(57) ABSTRACT

A mixer apparatus for use with a vessel centered about a longitudinal axis is disclosed. The mixer has a blade which: defines a central head axis; has a first end and a second end. The second end defines an inside blade diameter "ID" and the first end defines an outer blade diameter "OD". The blade is positioned within and coaxial to the vessel. A scotch yoke, operatively connected to the blade by a shaft, effects reciprocating longitudinal movement of the blade through a stroke "S", with a duration "T" for each cycle, wherein $175 \leq 0.36 \times OD^2/ID^2 \times S/T \leq 250$ when OD, ID and S are expressed in inches, and T is expressed in minutes.

22 Claims, 17 Drawing Sheets

U.S. PATENT DOCUMENTS

| | | | |
|---|---|---|---|
| 4,439,300 | A | 3/1984 | Houseman |
| 4,440,616 | A | 4/1984 | Houseman |
| 4,534,914 | A | 8/1985 | Takahashi et al. |
| 5,052,813 | A | 10/1991 | Latto |
| 5,100,242 | A | 3/1992 | Latto |
| 5,738,018 | A | 4/1998 | Burnett |
| 5,813,760 | A | 9/1998 | Strong |
| 5,947,784 | A | 9/1999 | Cullen |
| 6,007,237 | A | 12/1999 | Latto |
| 6,070,348 | A | 6/2000 | Bianchetti |
| 6,830,369 | B1 * | 12/2004 | Haughton et al. .......... 366/332 |

FOREIGN PATENT DOCUMENTS

| | | |
|---|---|---|
| DE | 75 04 145 U | 6/1975 |
| FR | 1 604 693 A | 1/1972 |
| FR | 2 605 244 A | 4/1988 |
| GB | 1 147 378 A | 4/1969 |
| JP | 63104638 | 5/1988 |
| JP | 11 184 420 A | 7/1999 |
| SU | 858 898 A | 8/1981 |
| SU | 967 541 A | 10/1982 |
| WO | WO 02/083280 A1 | 10/2002 |

OTHER PUBLICATIONS

Kendig, F. The Science of Smoke Rings and Doughnuts. Saturday Review, Mar. 18, 1972, pp. 40 and 44.

Maxworthy, T. Turbulent Vortex Rings. J. Fluid Mech. 1974, vol. 64, Part 2, pp. 227-239.

Baird et al. Velocity and Momentum of Vortex Rings in Relation to Formation Parameters. The Canadian Journal of Chemical Engineering, Feb. 1977, vol. 55, pp. 19-26.

Maxworthy, T. Some Experimental Studies of Vortex Rings. J. Fluid Mech. 1977, vol. 81, Part 3, pp. 465-495.

Saffman, P.G. The Number of Waves on Unstable Vortex Rings. J. Fluid Mech. 1978, vol. 84, Part 4, pp. 625-639.

Rohatgi, A. Mixing Effects and Hydronamics of Vortex Rings. Ph.D. Thesis at McMaster University, Hamilton, Ontario, Jun. 1978.

Pullin, D.I. Vortex Ring Formation at Tube and Orifice Openings. Phys. Fluids 22(3), Mar. 1979, pp. 401-403.

Rohatgi et al. Mixing Effects and Hydronamics of Vortex Rings. The Canadian Journal of Chemical Engineering, Aug. 1979, vol. 57, pp. 416-424.

Didden, N. On the Formation of Vortex Rings: Rolling-Up and Production of Circulation. Journal of Applied Mathematics and Physics (ZAMP) 1979, vol. 30, pp. 101-116.

Ontario Ministry of the Environment, Water Resources Branch, Province of Ontario. Hamilton Harbour Study 1977, Mar. 1981, pp. 1-A11.

Rohatgi et al. Gas Absorption at a Liquid Surface Agitated by Vortex Rings. The Canadian Journal of Chemical Engineering, Jun. 1981, vol. 59, pp. 303-309.

Glezer, A. An Experimental Study of a Turbulent Vortex Ring. Ph.D. Thesis at California Institute of Technology, Pasadena, California, 1981.

SU 858 898B (Umanskii, M.P.) Aug. 30, 1981 (abstract), Soviet Patent Abstracts, Week 198225, London: Derwent Publications Ltd., AN 1982-51962E.

SU 967 541 A (Fomenko, Y.) Oct. 23, 1982 (abstract), Soviet Patent Abstracts, Week 198334, London: Derwent Publications Ltd., AN 1983-745919.

Ahmad et al. Mixing of Stratified Liquids. Chem. Eng. Res. Des. May 1985, vol. 63, pp. 157-167.

Latto, B. "New Mixer for Slurries and Stratified Fluids" In: Proc. 12$^{th}$ Int. Conf. on Slurry Technology: Mar. 31-Apr. 3, 1987, New Orleans, Louisiana, U.S.A.. Edited by B. Sakkestad. Coal & Slurry Tech. Assoc., 1988, pp. 165-173.

JP 63 104638 A (Masatoshi). Patent Abstracts of Japan, vol. 12, no 344 (C-528), May 10, 1988 (abstract).

Latto et al. Mixing of Thermally Stratified Fluids by Injecting a Series of Vortex Rings—A Numerical Simulation. Trans IChemE, Sep. 1990, vol. 68, Part A, pp. 457-463.

Latto et al. "Use of Vortex Rings for Mixing". In: Industrial Applications of Fluid Mechanics 1990, ASME, New York, FED, vol. 100, pp. 79-86.

Hua, F. Numerical Simulation and Experimental Study of the Behaviour of Vortex Rings. Ph.D. Thesis at McMaster University, Hamilton, Ontario, 1994.

JP 11 184 420 A (Mistubishi Electric Corp.) Jul. 9, 1999 (abstract). Japan Patent Abstracts, Section PQ, Week 199938, London: Derwent Publications Ltd., An 1999-448427.

JP 11 184 420 A (Mistubishi Electric Corp.) Patent Abstracts of Japan, vol. 1999, No. 12, Jul. 9, 1999 (abstract).

* cited by examiner

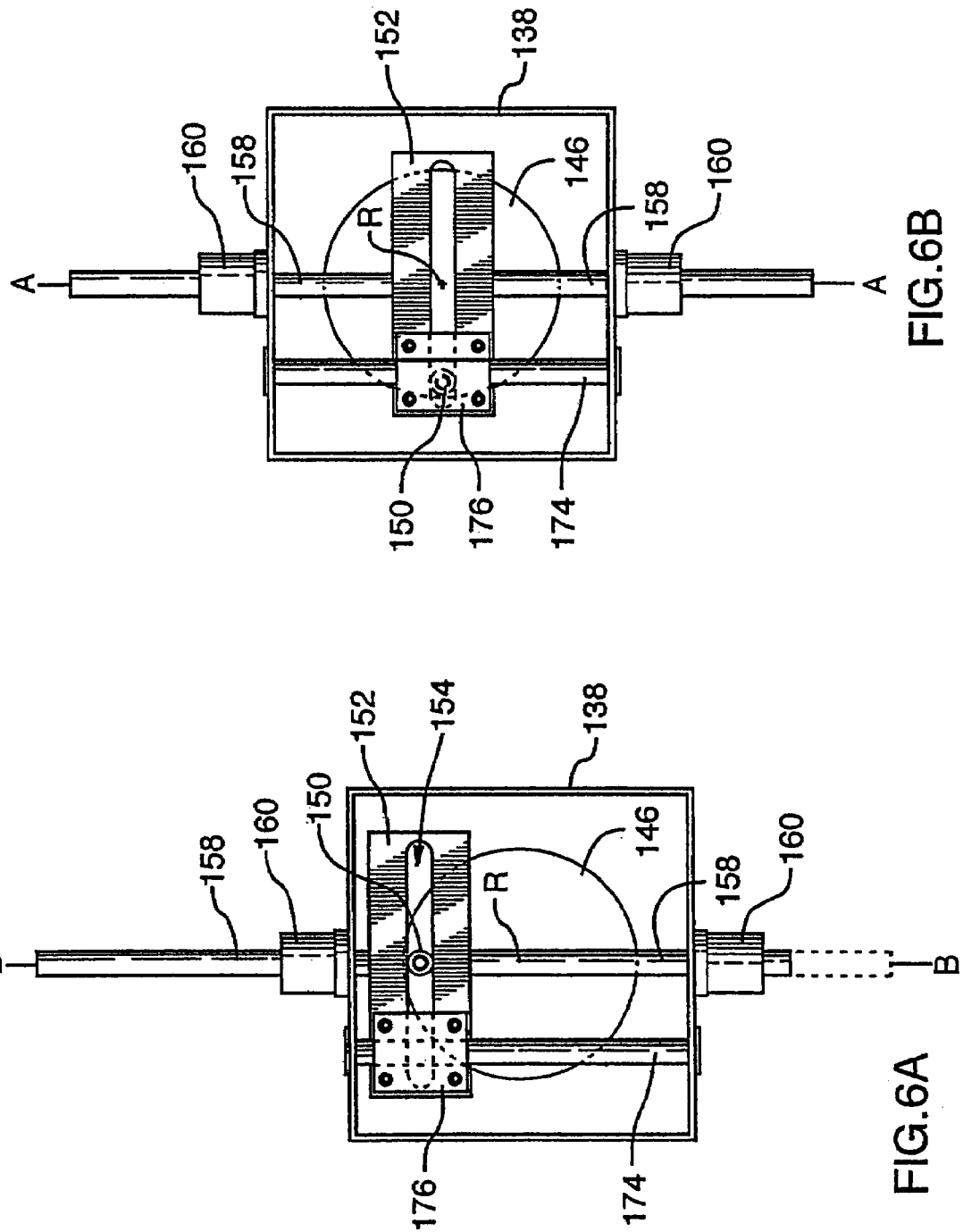

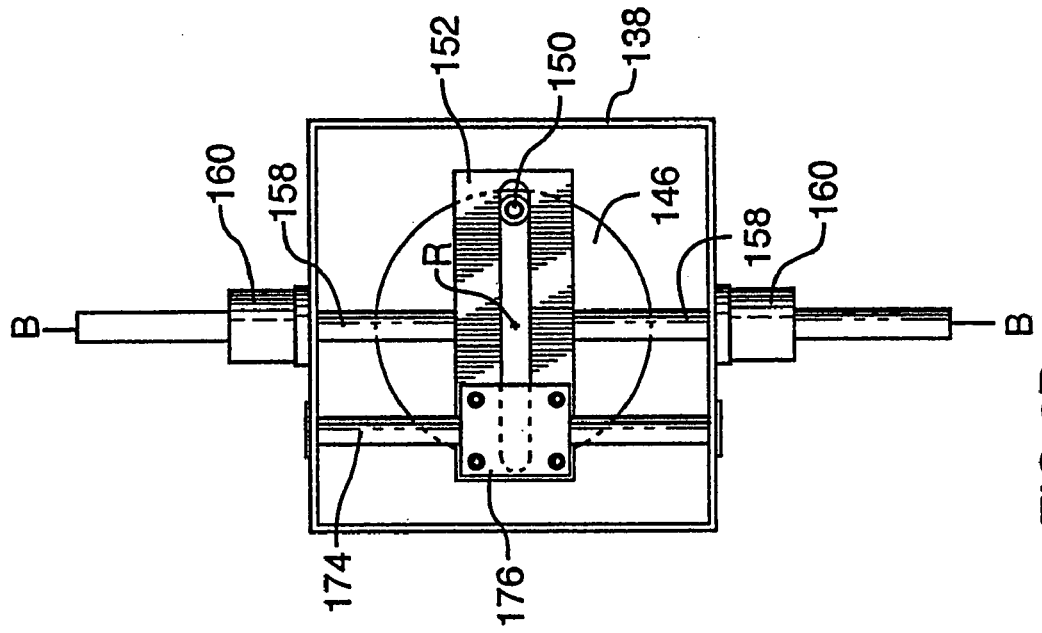
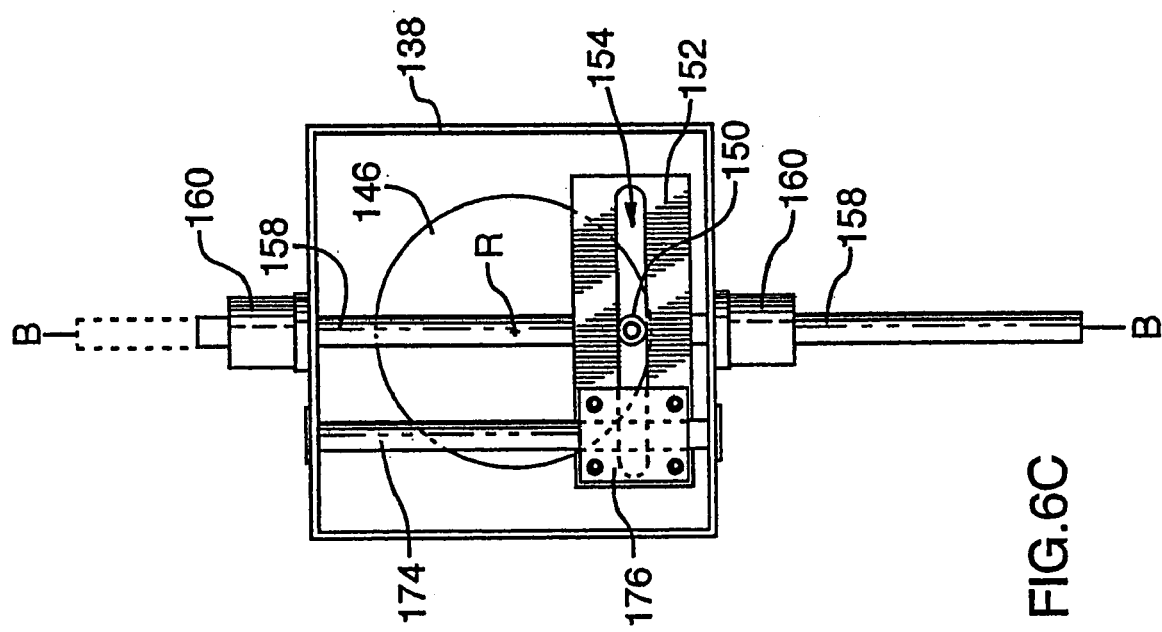

MIXING APPARATUS

CROSS-REFERENCE TO RELATED APPLICATIONS

This application is a continuation of Ser. No. 10/294,563 filed Nov. 15, 2002 now U.S. Pat. No. 6,830,369, which is a continuation-in-part of PCT/CA 02/00528 filed Apr. 17, 2002.

BACKGROUND OF THE INVENTION

The present invention generally relates to the field of mineral ore processing, and more particularly, to a mixing apparatus and to uses thereof in the separation of minerals from mineral bearing ores.

Processes are known in the prior art which provide for the separation of minerals from mineral bearing ores.

For example, in known processes used for the separation of copper from copper bearing ores, illustrated diagrammatically in FIG. 1, non oxidized ores 20 (which might contain as little as 0.5% copper, and typically contain iron sulfides) are processed in a crusher 22, with water 24, to form a slurry 26. The slurry 26 is then transferred to a flotation cell 28, and subjected to physical action, specifically, air sparging and mixing. As a result of the physical action, a substantial portion of the copper value in the slurry 26 rises to the surface of the flotation cell 28 as a froth 30, and is skimmed therefrom by a paddle mechanism 32, while the waste rock 33 ("gangue") remains in the bulk, and is ultimately passed from the cell 28 to a dryer 34 and discharged as tailings 36. This process of "froth separation" results from differences in wettability of copper as compared to other minerals, and is typically aided by chemical frothing and collector agents 38 added to the slurry 26, such that the froth 30 from such flotation contains 27 to 36% copper. Methylisobutyl carbonal (MIBC) is a typical frothing agent, and sodium xanthate, fuel oil, and VS M8 (a proprietary formulation) are typical collector agents.

The froth 30 is then fed to an oxygen smelter 40, and the copper and iron sulfides are oxidized at high temperature resulting in impure molten metal 42 (97–99%, copper, with significant amounts of iron oxide) and gaseous sulfur dioxide 44. The impure metal 42 is then transferred to an electrolytic purification unit 46, which separates the impure metal 42 into 99.99% purity copper material 48 and slag 50.

The gaseous sulfur dioxide 44 is collected in a reactor 52 wherein it is scrubber and mixed with water 24 to form sulphuric acid 54. The sulphuric acid 54 is suitably blended with water 24 and used to leach oxidized ores, typically by "heap leaching" an ore pile 56. The resultant copper bearing acid 58 is known as "pregnant leach solution". Pregnant leach solution 58 is also obtained by mixing solutions of sulphuric acid 54, in vats 60, with the tailings 36 discharged from flotation operations, to dissolve the trace amounts of copper remaining therein.

The copper is "extracted" from the pregnant leachate 58 by mixing therewith, in a primary extraction step 62, organic solvent 64 (often kerosene) in which copper metal preferentially dissolves. Organic chemical chelators 66, which bind solubilized copper but not impurity metals, such as iron, are also often provided with the organic solvent, to further drive the migration of copper. Hydroxyoximes are exemplary in this regard.

In the primary extraction step 62, the copper is preferentially extracted into the organic phase according to the formula:

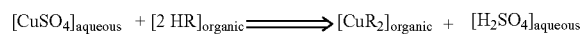

where HR=copper extractant (chelator).

The mixed phases are permitted to separate, into a copper laden organic solvent 68 and a depleted leachate 70.

The depleted leachate 70 is then contacted with additional organic solvent 72 in a secondary extraction step 74, in the manner previously discussed, and allowed to settle, whereupon the phases separate into a lightly loaded organic (which is recycled as solvent 64 in the primary extraction step) and a barren leachate or raffinate 76.

The barren leachate 76 is delivered to a coalescer 78 to remove therefrom entrained organics 80, which are recycled into the system; the thus conditioned leachate 82 is then suitable for recycling into the leaching system.

The pregnant organic mixture 68 (produced in the primary extraction step 62) is stripped of its copper in a stripping operation 84 by the addition of an aqueous stripping solution of higher acidity 86 (to reverse the previous equation); after phase separation, a loaded electrolytic solution 88 ("rich electrolyte") remains, as well as an organic solvent, the latter being recycled as solvent 72 in the secondary extraction 74.

The rich electrolyte 88 is directed to an electrowinning unit 90. Electrowinning consists of the plating of solubilized copper onto the cathode and the evolution of oxygen at the anode. The chemical reactions involved with these processes are shown below

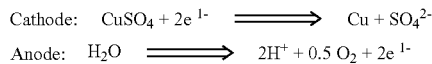

This process results in copper metal 92, and a lean (copper poor) electrolyte, which is recycled as stripping solution 86.

The combination of leaching, combined with extraction and electrowinning, is commonly known in the art as solvent extraction electrowinning, hereinafter referred to in this specification and in the claims as "SXEW".

In a known application of the described SXEW process, in both the primary 62 and secondary 74 extraction steps, the combined organic and aqueous phases are delivered through a series of mixing vessels (primary P, second S and tertiary T), and then to a settling tank ST, the primary mixing vessel P being about 8 feet in diameter and 12 feet in height, and stirred by a rotary mixer driven by a 20 horsepower motor, and each of the secondary S and tertiary T mixing vessels being about 12 feet in diameter and height, and stirred by a rotary mixer driven by a 7.5 horsepower motor. (The system of primary P, secondary S and tertiary T mixers, and settling tank ST, is replicated to meet volume flow requirements, with each system processing about 10,000 gpm). This provides a mixing regime wherein the organic and aqueous phases are intimately mixed for a period of time sufficient to allow copper exchange (to maximize copper recovery), yet relatively quickly separate substantially into organic and aqueous phases.

In a known application of the froth flotation process, a plurality of flotation cells 28, each being approximately 5 feet square and 4 feet high, are utilized, with pairs of cells sharing a 50 horsepower motor driving respecting rotary mixers (not shown). This provides a mixing regime sufficient to allow the air bubbles to carry the copper value to the surface.

Various modifications can be made to the rotary mixers in the extractors and in the flotation tanks of the foregoing process. However, the general configurations noted above have been found to provide relatively economical results, and significant variations therefrom can impact adversely upon economies. For example, an attempt to reduce energy costs by scaling down the motors for the mixers would have consequent impacts either upon the copper recovery efficiency, or upon available process throughputs. Specifically, the relatively large motors employed are required to drive the sturdy (and therefore heavy) rotary mixers and shafts that are needed to withstand the torques caused by rotation; lower power motors would demand either lower blade speed or smaller blades, with consequent impacts upon mixing and transfer efficiency.

BRIEF SUMMARY OF THE INVENTION

It is an object of the present invention to provide a novel mixing apparatus.

This object is met by the present invention which comprises a mixing apparatus. The mixing apparatus is advantageously used with a vessel having a contiguous sidewall centered about and defining a longitudinal axis.

As one aspect of the present invention, the mixing apparatus comprises a mixing head having a blade portion centered about and defining a head axis and having a first end and a second end.

The second end defines an inside blade diameter "ID" and the first end defines an outer blade diameter "OD". The mixing apparatus further comprises mounting means for mounting the mixing head substantially coaxial to and within the vessel for longitudinal movement relative thereto. Also provided is a reciprocating means for effecting said longitudinal relative movement of the mixing head in a reciprocating manner through a stroke length "S", with a duration "T" for each cycle, wherein $175 \leq 0.36 \times OD^2/ID^2 \times S/T \leq 250$ when OD, ID and S are each expressed in inches, and T is expressed in minutes.

As other aspects of the invention, an angle α, defined by the angle between the pair of axes defined by and coincident with the intersections of the surface of the blade portion and a plane coincident with the head axis, preferably is 180 degrees.

As other aspects of the present invention, the mounting means preferably comprises a mixer shaft. The mixer shaft has a bottom end operatively rigidly connected to the mixing head by a hub member rigidly connected to the bottom end of the mixer shaft and a plurality of support webs extending between and connecting the hub member and the blade portion, and extends from said bottom end, substantially parallel to the head axis, to a top end which is disposed above the vessel in use.

As yet another aspect of the present invention, the reciprocating means preferably comprises shaft gripping means for gripping the mixer shaft adjacent the top end thereof and effects longitudinal reciprocating movement of the shaft gripping means through stroke length "S" with duration "T" for each cycle, thereby to effect longitudinal movement of the mixing head in said reciprocating manner.

As another aspect of the present invention, a housing, positionable above said vessel, is preferably provided, and the reciprocating means preferably comprises a flywheel, a crank member, and a yoke.

The flywheel is mounted to the housing for rotation about a rotational axis which is normal to the longitudinal axis.

The crank member projects from the flywheel in a direction parallel to the rotational axis and is connected to the flywheel for rotation therewith.

The yoke is displaced from the flywheel in the direction of the crank member and has a substantially linear race formed therein which is in receipt of the crank member and is adapted to permit relative translational movement of the crank member and the yoke.

The yoke is positioned with the race arranged normal to the rotation axis and bisected thereby and is mounted to the housing in a manner which constrains movement of the yoke otherwise than along an axis parallel to the longitudinal axis and normal to the rotational axis, such that during rotation of the flywheel, the crank member imparts longitudinal reciprocating movement to the yoke.

As yet another aspect of the invention, the shaft gripping means is preferably operatively rigidly connected to the yoke for longitudinal reciprocating movement therewith.

The invention also comprises use of the mixing apparatus as a mixer for a vessel in an SXEW extractor unit, and as a mixer for the vessel in a froth flotation cell.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE SEVERAL VIEWS OF THE DRAWING

The novel features which are believed to be characteristic of the according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 6A is a front elevational view of the structure of FIG. 4, with the mixer shaft and shaft gripping means removed for clarity.

FIG. 6B is a view similar to FIG. 6A, with, inter alia, the flywheel displaced 90 degrees counter clockwise relative to its position in FIG. 6A.

FIG. 6C is a view similar to FIG. 6A, with, inter alia, the flywheel displaced 90 degrees counter clockwise relative to its position in FIG. 6B.

FIG. 6D is a view similar to FIG. 6A, with, inter alia, the flywheel displaced 90 degrees counter clockwise relative to its position in FIG. 6C.

DETAILED DESCRIPTION OF THE INVENTION

Figure 1:
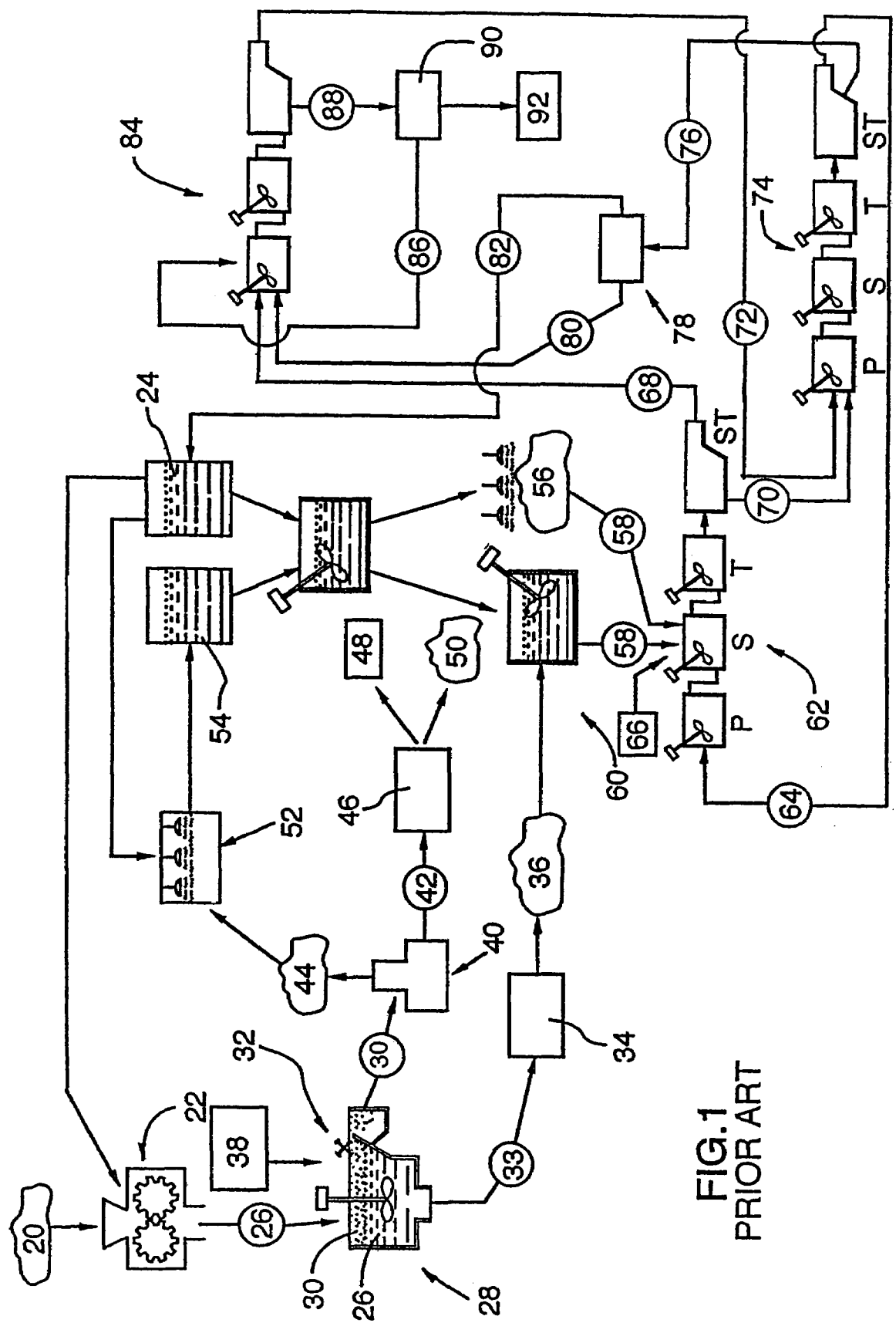
FIG. 1 is a diagrammatic representation of processes for copper extraction of the prior art.
Figure 2:
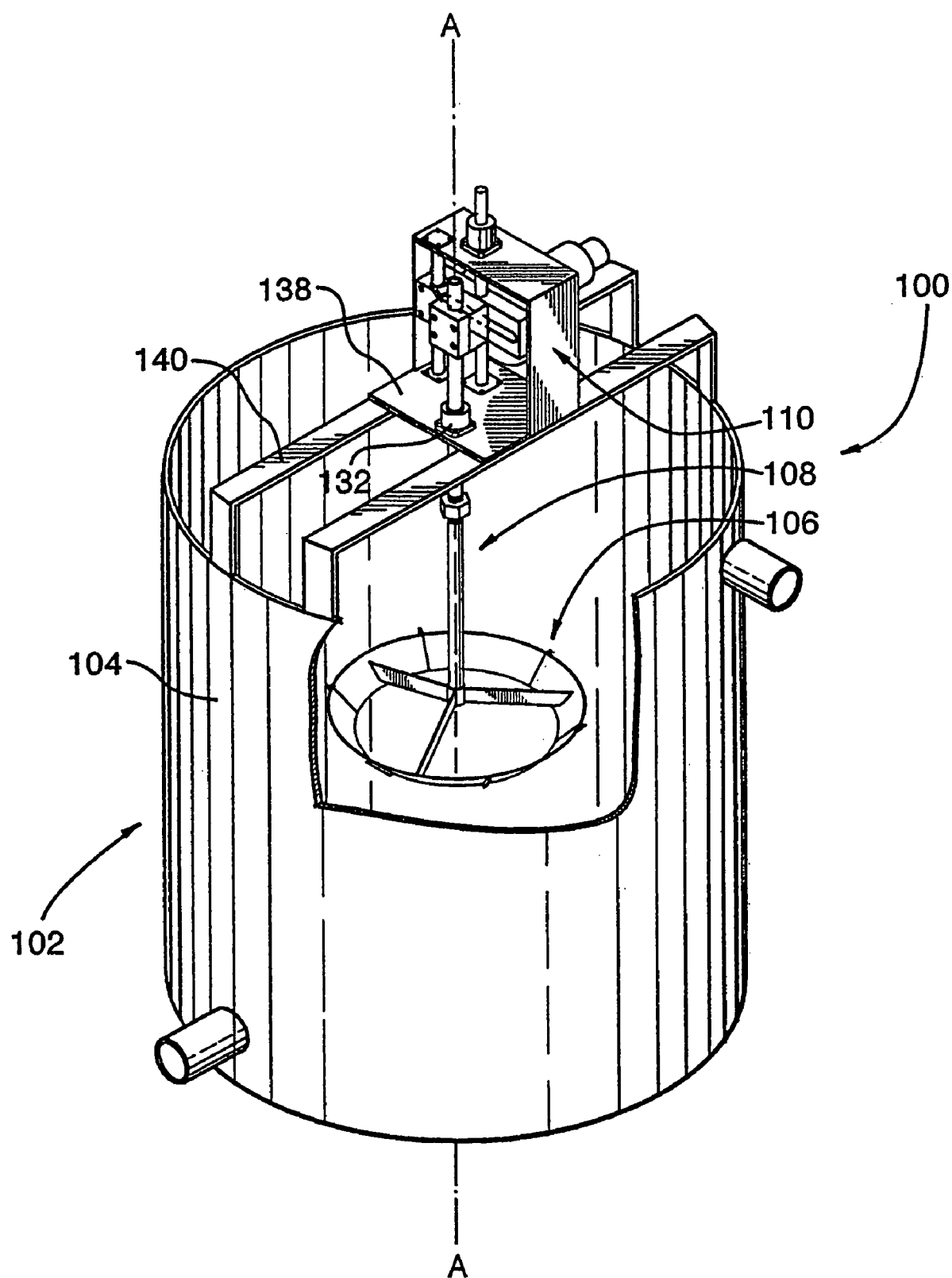
FIG. 2 is a front, top, left side perspective view of a mixing apparatus according to a preferred embodiment of the present invention, in a preferred use.

Referring now to FIG. 2 of the drawings, a mixing apparatus, according to a preferred embodiment of the present invention and designated with general reference numeral 100, is shown in use, in a manner fully described in following paragraphs, with a vessel 102 having a contiguous sidewall 104 centered about and defining a longitudinal axis A—A.

Full details of the preferred mixing apparatus of the present invention will be set out in following paragraphs. However, for greater clarity, it should firstly be understood, generally, that the mixing apparatus 100 comprises a mixing head 106 having a head axis H—H (illustrated in FIGS. 3, 7 and 8); mounting means for mounting the mixing head 106 substantially coaxial to and within the vessel 102 for longitudinal movement relative to the head axis H—H, said mounting means being designated with general reference numeral 108 in FIG. 2; and reciprocating means, designated with general reference numeral 110, for effecting said longitudinal relative movement of the mixing head 106 in a reciprocating manner.

The various parts of this preferred mixing apparatus will now be described with more particularity.

Figure 7:
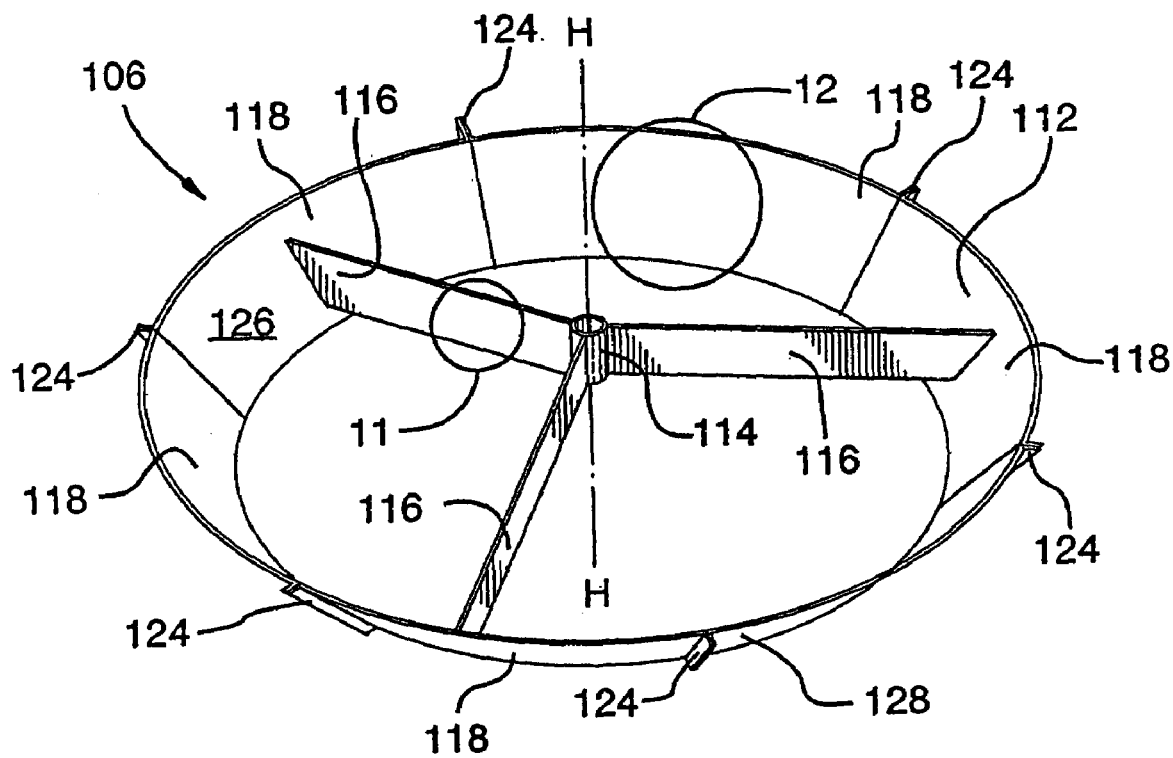
FIG. 7 is a front, top, left side perspective view of the mixing head of the structure of FIG. 2.
Figure 8:
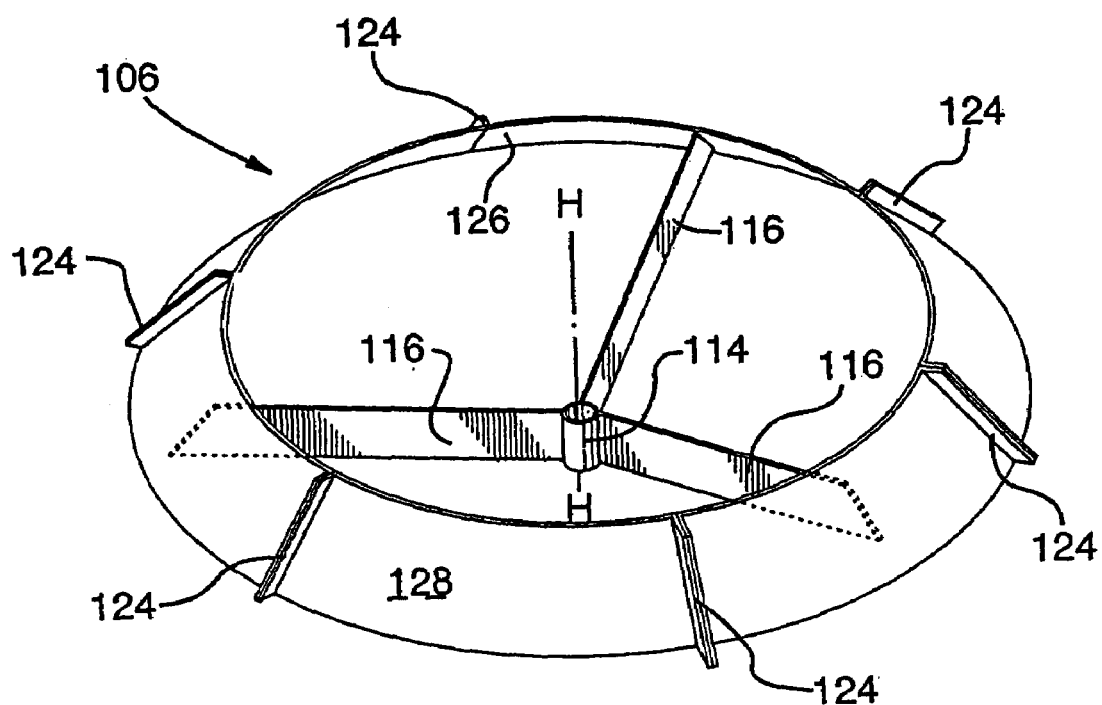
FIG. 8 is a rear, bottom, right side perspective view of the mixing head of the structure of FIG. 2.

With reference to FIG. 7, the mixing head 106 will be seen to include a blade portion 112, a hub member 114 and a plurality of support webs 116.

The blade portion 112, as shown, is constructed from six arcuate segments 118. The segments 118 are arranged in tubular relation so as to form a first tube end 120 and a second tube end 122, illustrated in FIG. 10, and are secured, by bolts (not shown), to one another through flanges 124 (see FIGS. 7, 8 and 9) provided at the ends of each segment 118 for this purpose.

The blade portion 112 defines and is centered about the head axis H—H, such that the first end 120 and the second end 122 of the blade portion 112 are spaced apart from one another therealong, and the blade portion 112 tapers in a substantially frustoconical manner from the first end 120 to the second end 122.

Figure 9:
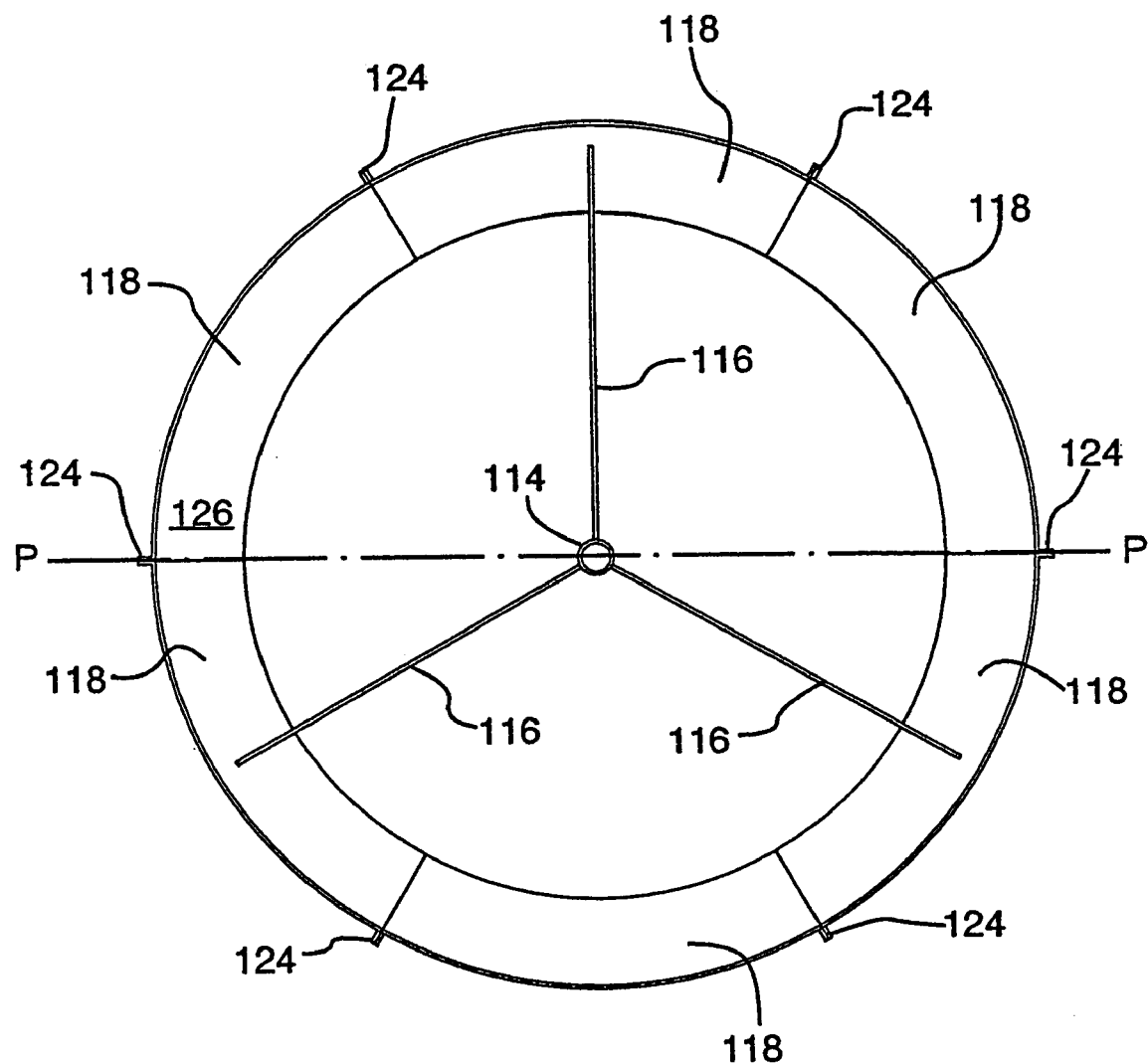
FIG. 9 is a bottom view of the mixing head.
Figure 10:
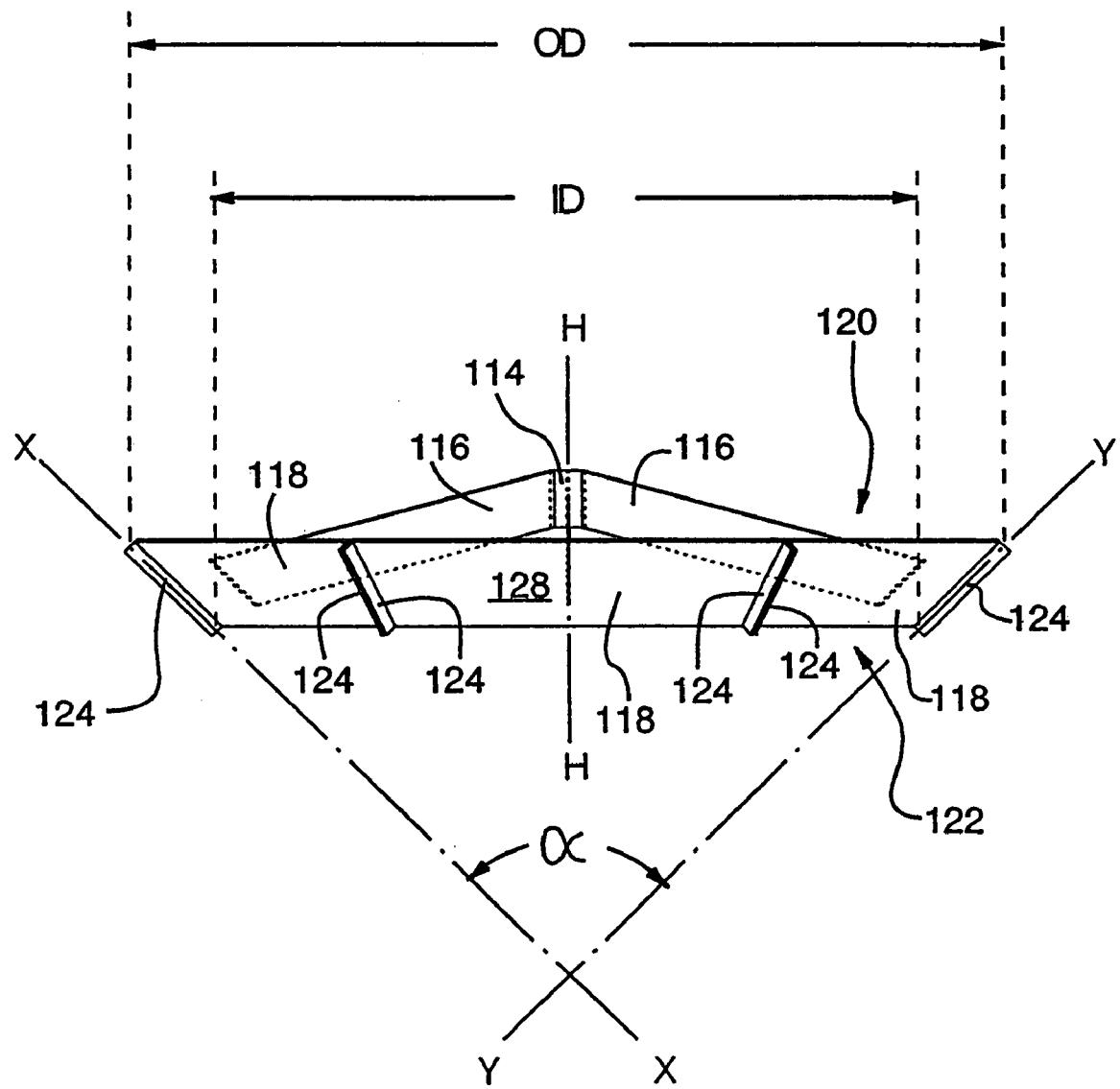
FIG. 10 is a left side view of the mixing head of FIG. 2.

The rate of taper is such that the angle α, defined by the angle between the pair of axes X,X and Y,Y, which axes are defined by and coincident with the intersections of the outer surface 128 of the blade portion 112 and a plane P—P coincident with the head axis, lies between 90 degrees and 180 degrees (90 degrees≦α≦180 degrees), as indicated in FIG. 9 and FIG. 10.

The hub member 114 is also tubular, and is centrally disposed adjacent to the blade portion 112.

The plurality of, specifically, three, support webs 116 each extend between and connect the hub member 114 and the blade portion 112. Such connection is effected by rivets or bolts (not shown).

Figure 3:
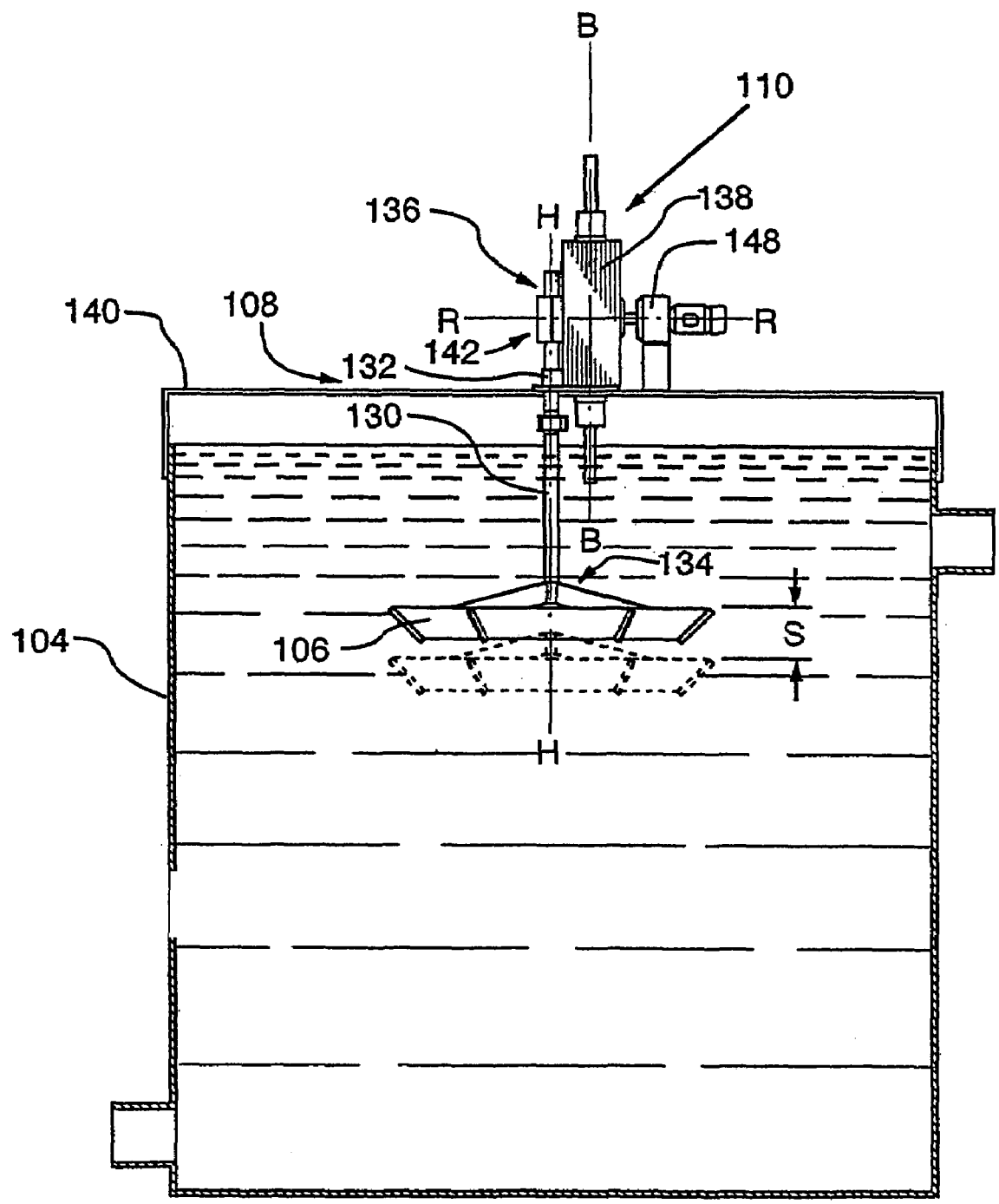
FIG. 3 is a left side cross sectional view of the structure of FIG. 2.

With reference now to FIG. 3, the preferred mounting means 108 will be seen to comprise a mixer shaft 130 and a linear bearing 132.

The mixer shaft 130 has a bottom end 134 operatively rigidly connected to the mixing head 106 and extends from said bottom end 134, substantially coincident with the head axis H—H, to a top end 136 which is disposed above the vessel 102 in use. Such rigid connection of the mixer shaft 130 and the mixing head 106 may be effected by, for example, threading the exterior of the bottom end of the mixer shaft, and providing a corresponding thread on the interior of the hub member (not shown).

The linear bearing 132 supports the mixer shaft 130 for longitudinal movement; this is effected in the preferred embodiment by mounting the bearing 132 to a housing 138 which is itself mounted, as illustrated in FIG. 2, to a frame 140 which, in the preferred embodiment shown, spans over the vessel 102.

Figure 4:
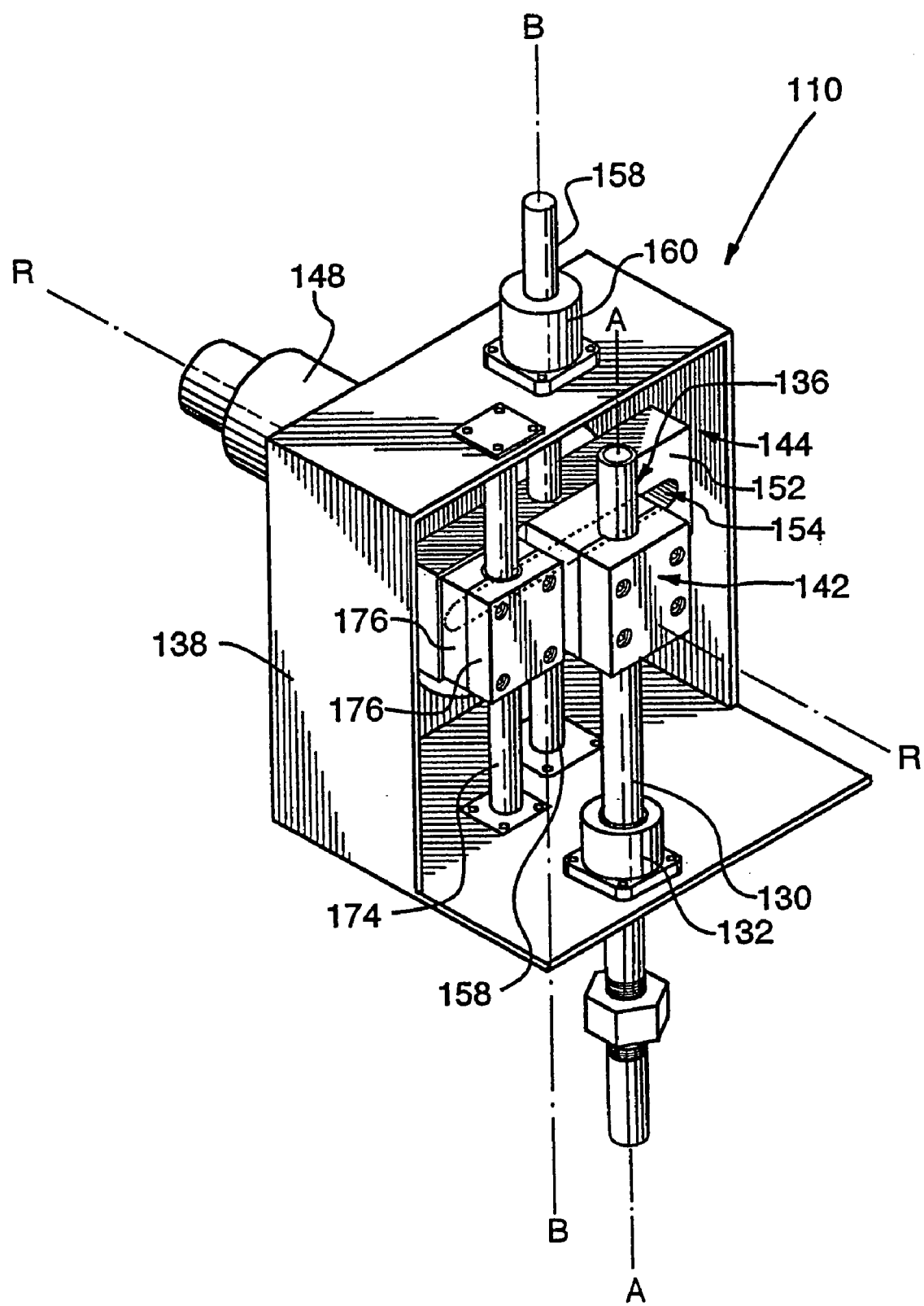
FIG. 4 is a front, top right side perspective view of the reciprocating means and mounting means of the mixing apparatus of FIG. 2.

As best illustrated in FIG. 4, the reciprocating means 110 comprises a shaft gripping means, designated with the general reference numeral 142, for gripping the mixer shaft 130 adjacent its top end 136 and for effecting longitudinal reciprocating movement of the shaft 130 through stroke length "S" with duration "T" for each cycle, thereby to effect coincident longitudinal movement of the mixing head 106 in said reciprocating manner through the same stroke length "S", as indicated in FIG. 3, wherein the mixing head 106 is shown in blackline in a starting position, and in phantom outline, at a position longitudinally displaced from the starting position through a distance "S".

Figure 5:
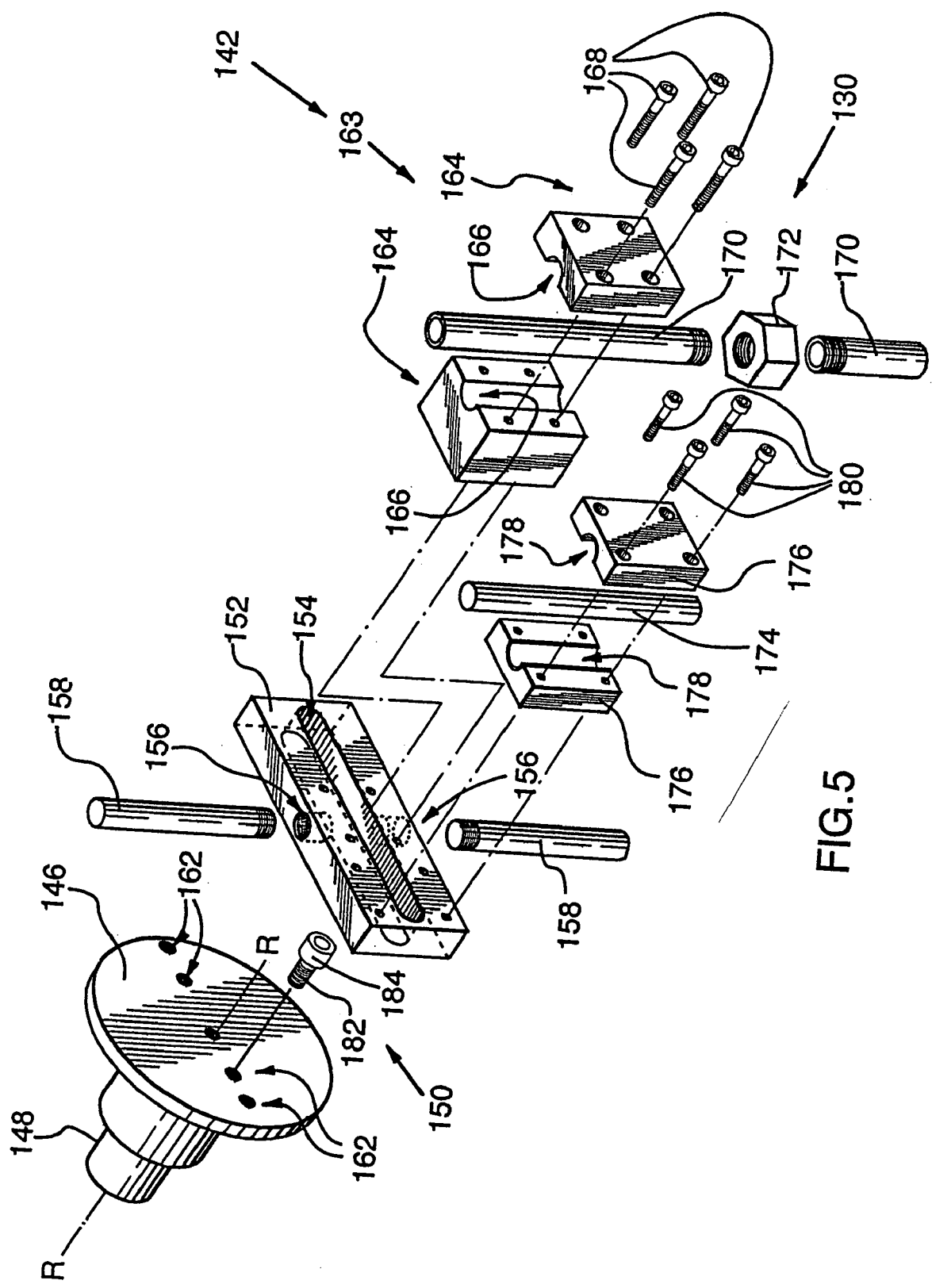
FIG. 5 is an exploded perspective view of a part of the structure of FIG. 4.

Such reciprocating movement is effected through a scotch yoke apparatus 144, comprising a flywheel 146, a drive means 148, a crank member 150 and a yoke 152, illustrated in FIG. 4 and in FIG. 5.

The flywheel 146 is mounted to the housing 138 for rotation about a rotational axis R—R (illustrated in FIG. 4) which is normal to the longitudinal axis A—A.

The drive means 148 is for driving rotation of the flywheel 146 and, in the preferred embodiment illustrated, comprises an explosion proof electric motor, operatively connected by its drive shaft (not shown) to the flywheel 146.

The crank member 150 projects from the flywheel 146 in a direction parallel to the rotational axis R—R and is connected to the flywheel 146 for rotation therewith.

The yoke 152 is displaced from the flywheel 146 in the direction of the crank member 150 and has formed therein a substantially linear race 154 which is in receipt of the crank member 150 and is adapted to permit relative translational movement of the crank member 150 and the yoke 152 as the flywheel 146 rotates.

The yoke 152 has threaded, coaxial bores 156 disposed on its upper and lower surfaces to receive respective threaded guide shafts 158. Corresponding guide bearings 160 are provided on the housing 138. When the yoke 152 is operatively mounted with the guide shafts 158 disposed within the guide bearings 160, the yoke 152 is positioned with the race 154 arranged normal to the rotation axis R—R and bisected thereby, and is mounted to the housing 138 in a manner which constrains movement of yoke 152 otherwise than along an axis B—B parallel to the longitudinal axis A—A and normal to the rotational axis R—R (best indicated in FIG. 4), such that during rotation of the flywheel 146, the crank member 150 imparts longitudinal reciprocating movement to the yoke 152, as indicated by the sequence of FIGS. 6A 6D.

The length of the resultant stroke may be selected by suitable adjustment to the radial position of the crank member 150 (that is, the distance between the crank member 150 and the rotation axis R—R); for this reason, the crank member 150 is threaded, and a plurality of threaded sockets 162 are provided in a radial array on the face of the flywheel 146, as illustrated in FIG. 5. The duration of each stroke may be selected by suitable adjustment to the rotational speed of the electric motor 148.

In the preferred embodiment, the yoke moves through a stroke length "S", with a duration "T" for each cycle, wherein $175 \leq 0.36 \times OD^2/ID^2 \times S/T \leq 250$ when T is expressed in minutes, S is expressed in inches, "ID" is an inside blade diameter, expressed in inches and defined by the inner surface 126 of the blade portion 112 and the second end 122, and "OD" is an outside blade diameter, expressed in inches and defined by the outer surface 128 of the blade portion 112 and the first end 120, as indicated in FIG. 10.

Returning to FIGS. 4 and 5, the shaft gripping means 142 preferably comprises a clamp 163, specifically, a pair of mating clamping blocks 164, each having a concave groove 166 of semi circular cross section formed therein to grippingly receive the mixer shaft 130. Clamp 163 is selectively rigidly affixed, by bolts 168, to the yoke 152, such that longitudinal reciprocating movement is imparted to the shaft gripping means 142 by said longitudinal reciprocating movement of the yoke 152.

This clamp arrangement permits the relative depth of the mixing head 106 in the vessel 102 to be conveniently adjusted from above; the clamp 163 need only be loosed, by disengaging the associated bolts 168, whereupon mixer shaft 130 can be raised or lowered as desired, and bolts 168 re engaged.

The mixer shaft 130 is itself preferably constructed of a plurality of tube segments 170, threaded at their ends and joined to one another in end to end relation by threaded couplings 172, so that segments 170 can be added or removed as desired, thereby to permit the aforementioned adjustment feature to be more conveniently and fully exploited.

With general reference to FIG. 4 and FIG. 5, stresses created on the yoke 152, by virtue of its carriage of the shaft gripping means 142, are preferably countered by the provision of a balancing shaft 174, rigidly connected to the housing 138 to extend substantially parallel to longitudinal axis A A, and by a pair of mating linear bearing blocks 176, each having a respective groove 178 of semi circular cross section formed therein sheathed with a self lubricating material such as polytetrafluorethylene, which are mounted to the yoke 152 by bolts 180 and slidably receive the balancing shaft 174 therethrough.

It has been found that the present invention can be used to great advantage as a mixer for a vessel in a SXEW extractor unit, as illustrated in FIGS. 2 and 3.

EXAMPLE 1

In the known application of the SXEW process previously described, samples were taken from the outfall of each of the primary vessel; secondary vessel; tertiary vessel and settling tank of a respective secondary extraction unit (A) and permitted to separate.

In a parallel secondary extraction unit (B) (ie processing a pregnant leachate of substantially identical composition), a mixing apparatus in accordance with the present invention (OD=60; ID=48; α=120; S=10; T=0.0333, driven by a 2 hp motor) was substituted for the rotary mixer in the secondary mixing vessel, and samples were again taken from the outfall from each of the primary, second and tertiary mixing vessels, and from the settling tank, and permitted to separate.

Copper concentration (g/l) was measured in the organic component of each sample, as follows:

|  | (A) Cu (g/l) | (B)30 cpm Cu (g/l) |
| --- | --- | --- |
| Primary mixing vessel | 2.01 | 2.01 |
| Secondary mixing vessel | 2.06 | 2.06 |
| Tertiary mixing vessel | 2.12 | 2.13 |
| Settling tank | 2.14 | 2.13 |

As would be expected, copper concentration from the primary mixing vessel in each of the A and B lines is similar (because to that point in the process, mixing is provided by identical rotary mixers). However, unexpectedly, copper concentrations in the outfall from the secondary mixers also remained identical, and copper concentration in the outfall from the settling tanks remained quite similar, despite the almost 75% reduction in energy input (2 hp drive motor for the reciprocating mixer, as compared to the 7.5 hp motor driving the rotary mixer).

EXAMPLE 2

In a second test, the B line of Example 1 was modified by altering the motor speed of the mixer of the present invention, such that it operated at 45 cycles/minute (T=0.0222).

Copper concentration (g/l) was again measured, as follows:

|  | (B)[45 cpm] Cu (g/l) |
| --- | --- |
| Primary mixing vessel | 2.00 |
| Secondary mixing vessel | 2.08 |
| Tertiary mixing vessel | 2.11 |
| Settling tank | 2.16 |

Again, as would be expected, copper concentration from the primary mixing vessel in the B line remained similar to that obtained in the A line (because to that point in the process, mixing is provided by identical rotary mixers). However, unexpectedly, copper concentrations in the outfall from the settling tank from the modified B line showed significant improvement over the A line results (copper recovery improved from 2.14 g/l to 2.16 g/l).

Without intending to be bound by theory, it is believed the mixing apparatus of the present invention provides mixing currents which [at least in the context of the liquids utilized in SXEW copper extraction, in a vessel having an internal diameter D and a height H, wherein OD:D is between about 1:2.5 to 1:4, OD:ID is between about 1:0 to 1.5; and D:H is approximately 1:1] create a dispersion characterized by consistent sized droplets, uniformly distributed throughout the mixing vessel, whereas in a rotary mixer, there is a wide variation in drop sizes, and in the distribution of said drops, (perhaps due to the fact that the blade in a rotary mixer moves at different speeds along its length). This uniform dispersion is believed to provide an environment amenable to efficient mass transfer between phases, while at the same time providing for substantial disengagement of the mixed phases within a relatively short time frame.

Whereas the illustrations depict an embodiment of the present invention which is preferred, various modifications are contemplated.

Figure 17:
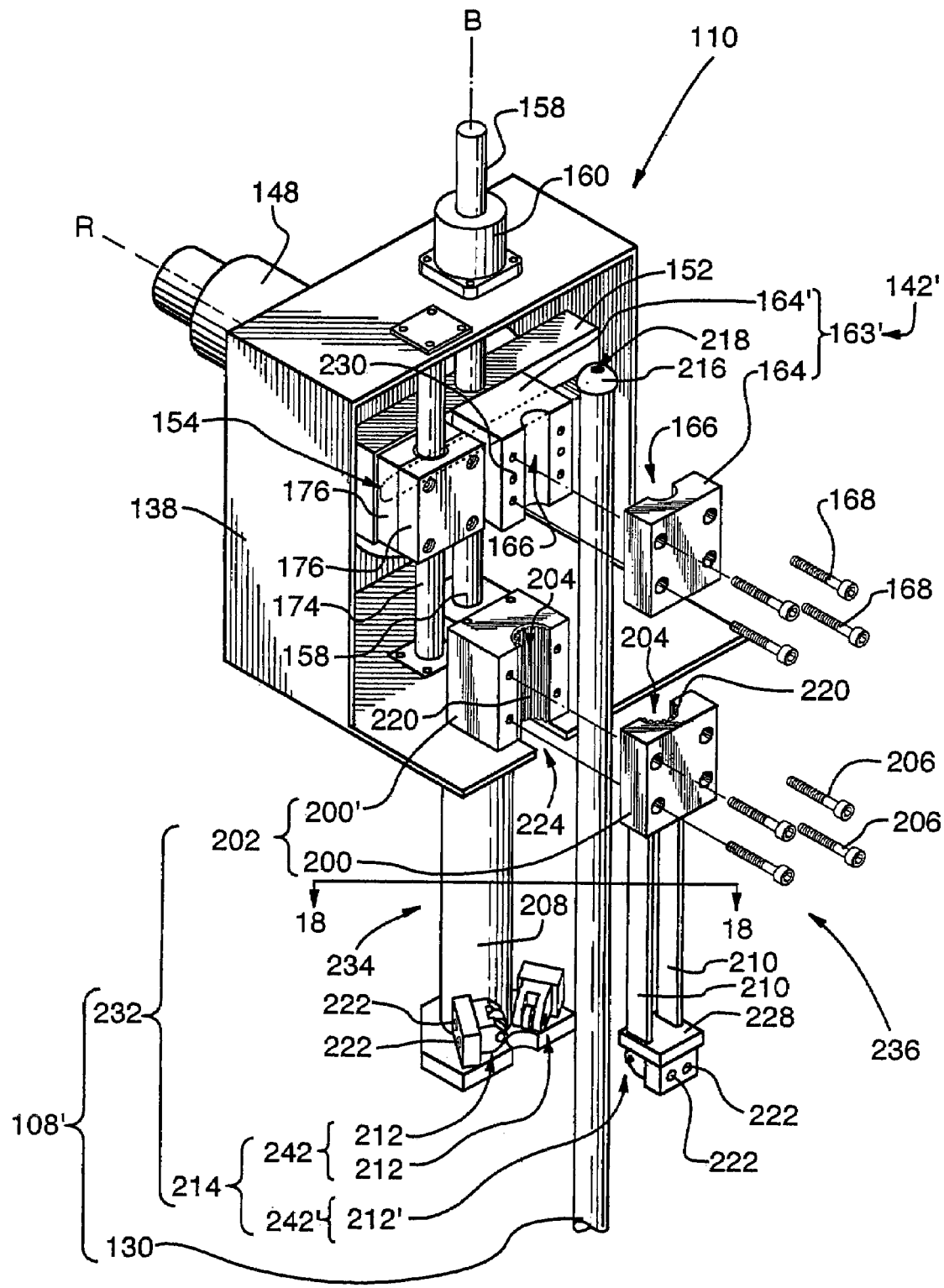
FIG. 17 is a partially exploded view similar to FIG. 4, showing a first alternate mounting means and a first alternate shaft gripping means.
Figure 18:
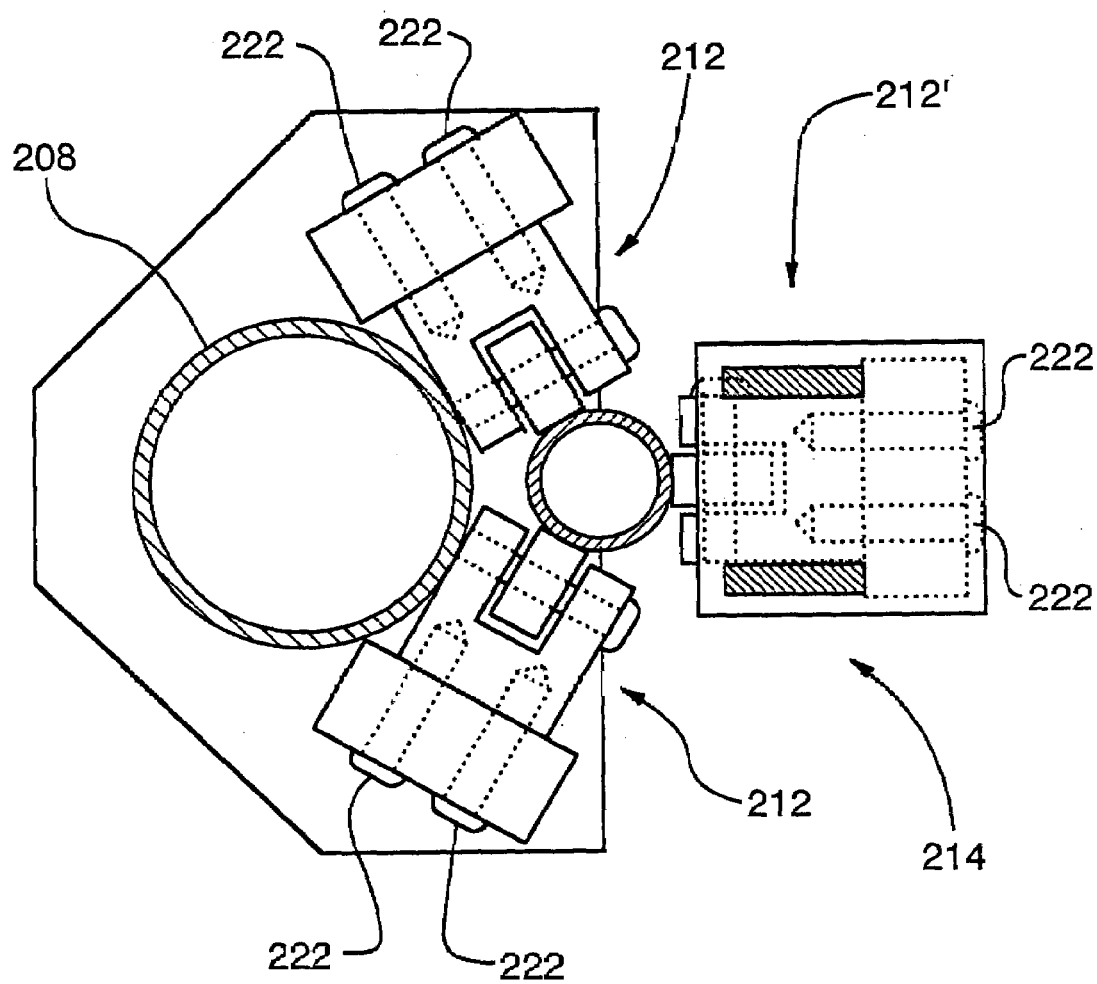
FIG. 18 is a sectional view, along sight line 18—18 of FIG. 17, with the apparatus fully assembled.

One such modification, which is depicted in FIG. 17 and in FIG. 18, relates to a modification of the mounting means 108 and the shaft gripping means 142. Specifically, in this structure, an alternate shaft gripping means 142' is depicted, as is an alternate mounting means 108' which includes a linear bearing assembly 232 supporting the mixer shaft 130, in use, for longitudinal movement, the linear bearing assembly 232 so supporting the mixer shaft 130 at a first location, relatively proximal to the shaft gripping means 142', and at a second location, disposed downwardly from the first location and relatively distal to the shaft gripping means 142'.

The alternate shaft gripping means 142' comprises a clamp 163', specifically, a pair of mating clamping blocks 164,164' each having a concave groove 166 of semi circular cross section formed therein. Clamping block 164' is secured by bolts 230 to the yoke 152, such that longitudinal reciprocating movement is imparted to clamping block 164' by said longitudinal reciprocating movement of the yoke 152. Clamping block 164 is secured by bolts 168 to clamping block 164', with the grooves 166,166 thereof in opposed relation, to grippingly receive therewithin the mixer shaft 130 and impart longitudinal reciprocating movement thereto by said longitudinal reciprocating movement of the yoke 152.

The linear bearing assembly 232 includes a bushing 202 formed of mating bushing blocks 200,200'. Each bushing block 200,200' has a concave groove 204 of semi circular cross section formed therein, said groove 204 being sheathed with an arcuate pad 220 of self lubricating material such as polytetrafluoroethylene. The bushing 202 supports the mixer shaft 130, at the aforementioned first location, for longitudinal movement; this is effected in the alternate preferred embodiment shown by securely mounting bushing block 200' to the housing 138 and providing for the secure attachment of the bushing blocks 200',200 to one another by bolts 206, with the grooves 204,204 thereof in opposed relation, to slidingly receive within pads 220,220 said mixer shaft 130. As shown, pads 220,220 are preferably ribbed.

The linear bearing assembly 232 further includes a linear bearing 214 composed of a plurality of rollers 212,212,212' arranged in a pair of mating roller subassemblies 242,242'. A tubular fixed support 208, which depends downwardly from the housing 138, is provided, and, towards the bottom extent thereof, has roller subassembly 242 mounted thereto by bolts 222,222. A pair of removable supports 210,210 are also provided. The removable supports 210,210 are securely attached to bushing block 200 and depend downwardly therefrom to a terminus 228.

Roller subassembly 242', including roller 212', is secured to supports 210,210 adjacent their terminus 228 by bolts 222,222, such that, in use, when bushing blocks 200,200' are operably secured to one another, rollers 212,212,212' circumferentially surround mixer shaft 130, as shown in FIG. 18, at a position beneath and longitudinally spaced from bushing 202, so as to support said mixer shaft 130 at said second location, thereby limiting flexure, while at the same time permitting longitudinal movement thereof.

It will be evident that the foregoing defines, in the linear bearing assembly 232, a first portion (formed of the bushing block 200', the tubular support 208, and roller subassembly 242) designated with general reference numeral 234 securely attached to the housing 138 and disposed to one side of the mixer shaft 130 in use, as well as a second portion (formed of bushing block 200, supports 210,210 and roller subassembly 242'), designated with general reference number 236, which is disposed to the other side of the mixer shaft 130 in use and is operatively removably secured to the housing 138 to permit, when removed, removal and replacement of the mixer shaft 130. A slot 224 is conveniently provided in the housing 138, to provide clearance for the mixer shaft 130.

Merely by removing bolts 168 in clamping block 164 and bolts 206 in bushing block 200, the clamping block 164 and the second portion 236 may be removed, whereupon mixer shaft 130 may be removed, for servicing or the like.

To facilitate handling of the mixer shaft 130, same is formed with an upper enlarged end portion 216, in which is provided a threaded bore 218, to receive a threaded lifting lug (not shown).

Figure 20:
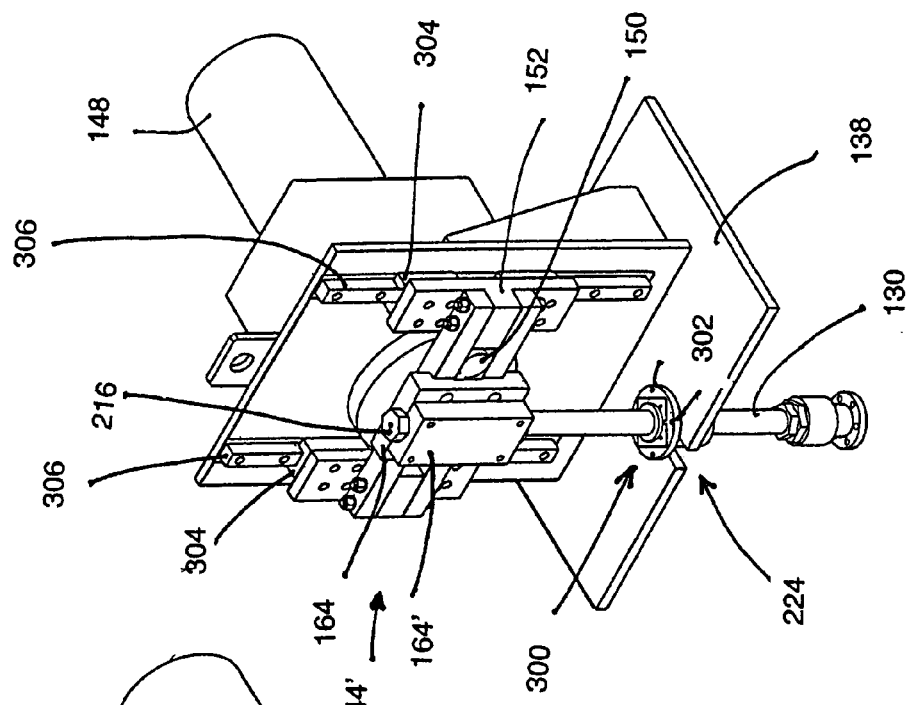
FIG. 20 is a perspective view of the second alternate mounting means and the second alternate shaft gripping means, with the apparatus fully assembled.
Figure 19:
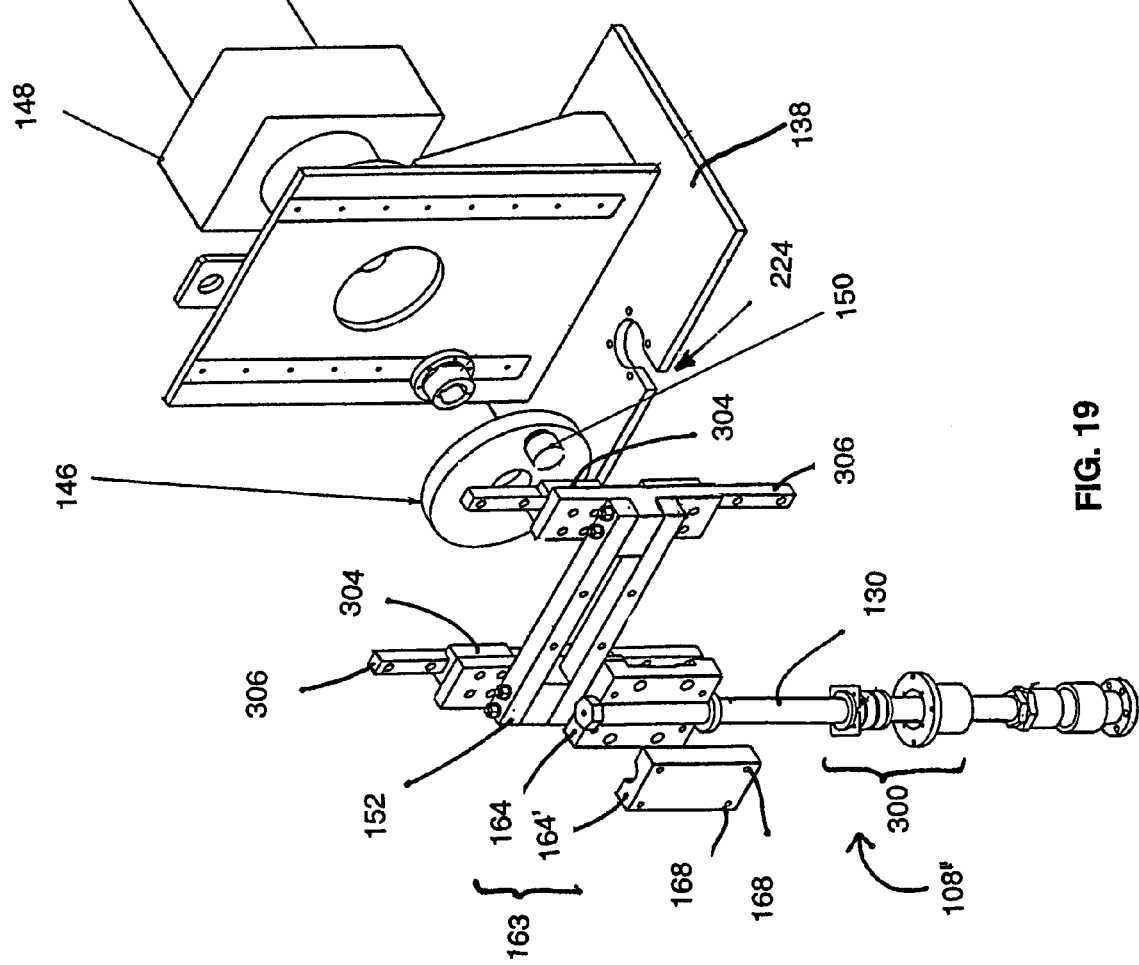
FIG. 19 is a partially exploded perspective view of a second alternate mounting means and a second alternate shafting gripping means.

FIGS. 19, 20 illustrate yet another modification which includes a second alternate mounting means 108" and an alternate scotch yoke apparatus 144'. This modification has many structural elements in common with the embodiments described in FIGS. 1–18, which elements are identified with the same reference numerals as employed previously. For example, in this modification, a slot 224 is provided in the housing 138, similar to that provided in the structure of FIGS. 17,18, to permit removal of the shaft 130. However, whereas in the structure of FIGS. 17,18, a two-part bushing 202 was provided, in this modification, a sleeve-type linear plain bearing 300 is utilized, which is secured to housing 138 by bolts 302. As well, a yoke 152 is provided, similar to that shown in FIGS. 17,18, but whereas the yoke 152 of FIGS. 17,18 is mounted for reciprocating movement by shaft 158 and bearings 160,160 in this alternate scotch yoke apparatus 144', the yoke 152 is mounted by means of dovetail linear slide bearings formed of saddles 304,304 securely mounted to the yoke 152 and mating tracks 306 rigidly mounted to housing 138. A support flange 308 is also provided on mixing shaft 130. Support flange 308, in combination with enlarged shaft head 216, provides for a mechanical connection between the shaft 130 and the clamp 163, in addition to the frictional connection effected by the clamping blocks 164,164'.

By virtue of the use of plain bearing 300, it will be evident that, in order to remove mixer shaft 130, bearing 300 must first be detached from the housing 138, through the removal of screws 302. However, in all other aspects, the structure of this modification operates in a manner substantially identical to that in which the structure of FIG. 17 and FIG. 18 operates, and as such, is not described in detail herein.

Other modifications are also possible.

For example, whereas in the embodiments disclosed, a scotch yoke apparatus is utilized to provide linear reciprocating movement, it will be evident that other mechanisms, such as crank shafts, cam and cam follower mechanisms, and swash plates are possible substituents therefor. It should also be noted that, while in the preferred embodiment illustrated, head axis H—H and longitudinal axis A—A are coincident, this need not be the case.

As well, whereas in the preferred embodiment illustrated, the mixing head tapers uniformly along its length, so as to take on a substantially frustoconical shape, and the mounting means is adapted to mount the mixing head to the vessel with the first tube end disposed above the second tube end, it is possible for the mixing head to assume non frustoconical form.

Figure 11:
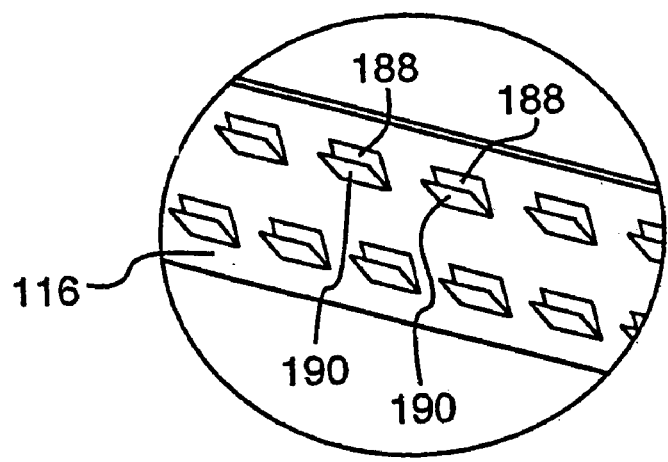
FIG. 11 is a view of an alternate embodiment of the support webs of the invention, which view corresponds to the area circumscribed by circle 11 in FIG. 7.
Figure 12:
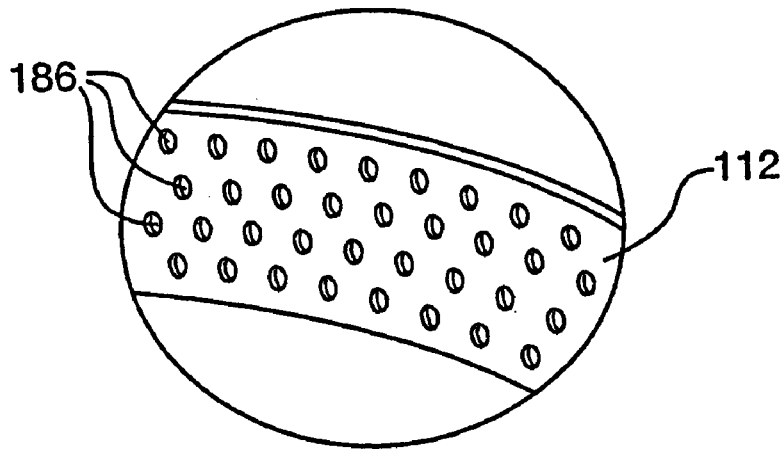
FIG. 12 is a view of an alternate embodiment of the blade portion of the present invention, which view corresponds to the area circumscribed by circle 12 in FIG. 7.

Additionally, whereas the preferred blade portion and support webs are substantially smooth, it is contemplated that the blade portion 112 can be formed with a plurality of perforations 186, as illustrated in FIG. 12, and that the support webs 116 may be provided with a plurality of perforations 188, as well as a plurality of tabs 190 each substantially overlying a respective perforation 188 and being connected to the support web 116 at one edge of said respective perforation 188 to form a gill, as illustrated in FIG. 11. In this manner, the characteristics of the mixing currents produced by the blade portion in motion can be finely tuned to control the droplet size of the dispersion, and hence, the mixing efficiency of the device, which feature is not available in prior art mixers.

Figure 13:
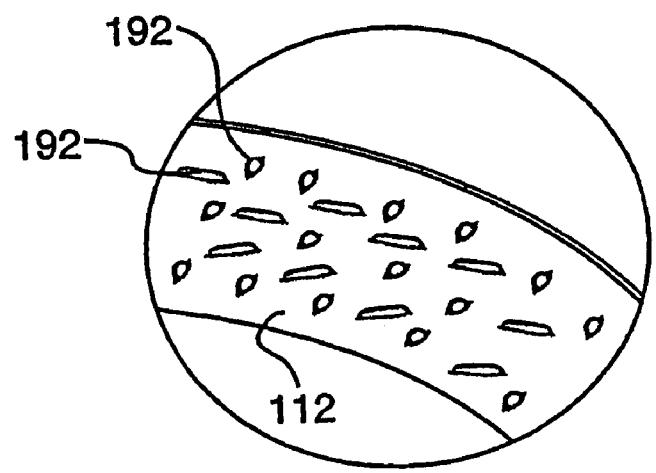
FIG. 13 is a view similar to FIG. 12, showing a further embodiment of the blade portion of the invention.

As a further alternative, illustrated in FIG. 13, the blade portion 112 may be provided with a plurality of dimples 192 projecting outwardly therefrom. This allows fine tuning of the mixing device in a manner not taught by the prior art.

For the purpose of minimizing friction, the preferred crank member 150 is of two part construction, including an inner axle portion 182 which is fixedly connected to the flywheel 156 and an outer roller portion 184 which is rotatably mounted by bearings (not shown) on the axle portion 182 (best illustrated in FIG. 5). However, this is not necessary.

Figure 16:
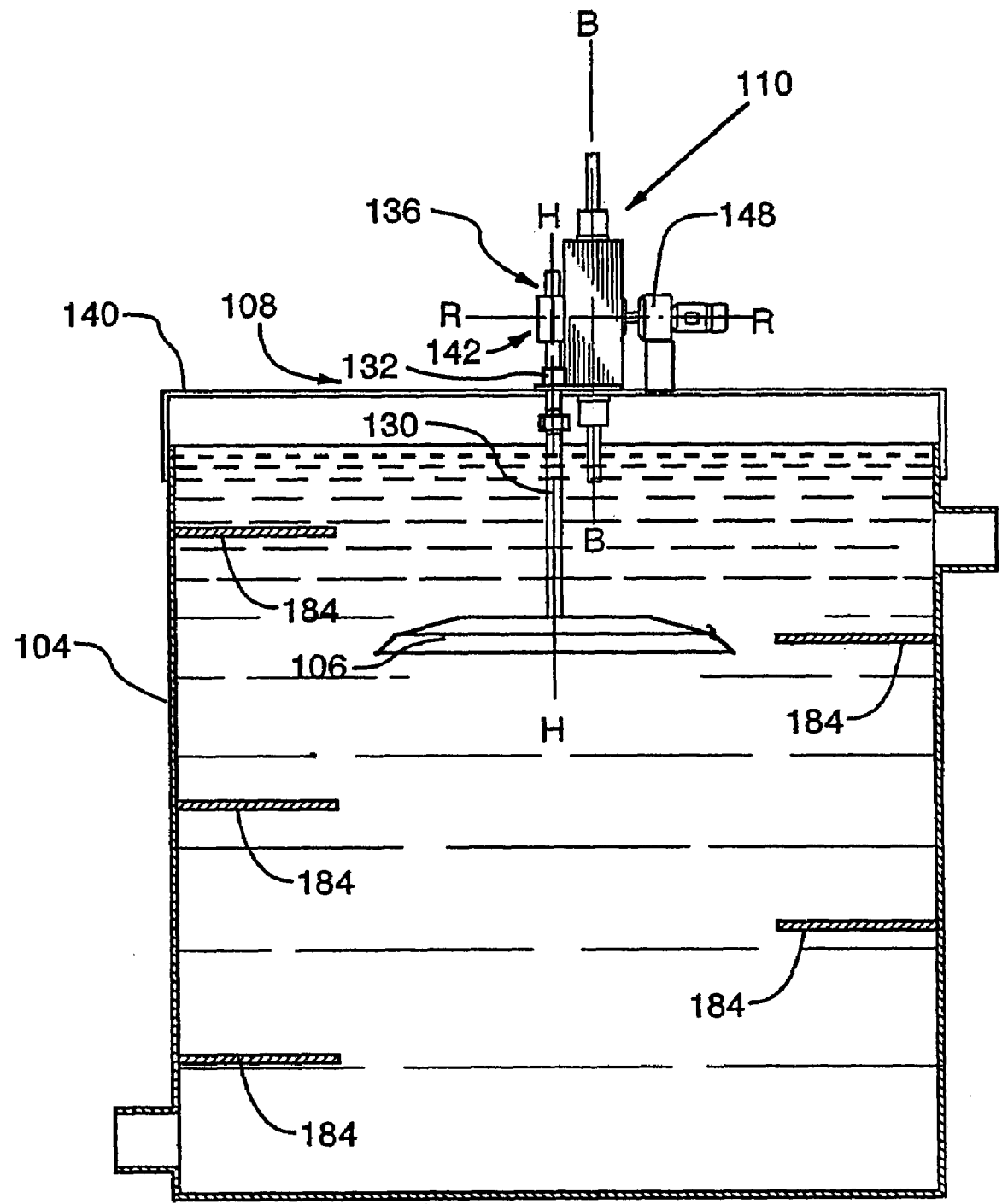
FIG. 16 is a view similar to FIG. 3, illustrating the mixing apparatus according to an alternative embodiment in a further alternative use.

Flow baffles 184 can also be disposed within the vessel, as indicated also in FIG. 16.

Of course, whereas the detailed description herein pertains specifically to the recovery of copper from copper bearing ores, it should also be understood that the present invention may be utilized in other applications wherein SXEW processes are utilized, such as, for example, in the recovery of zinc, nickel, platinum and molybdenum.

Figure 14:
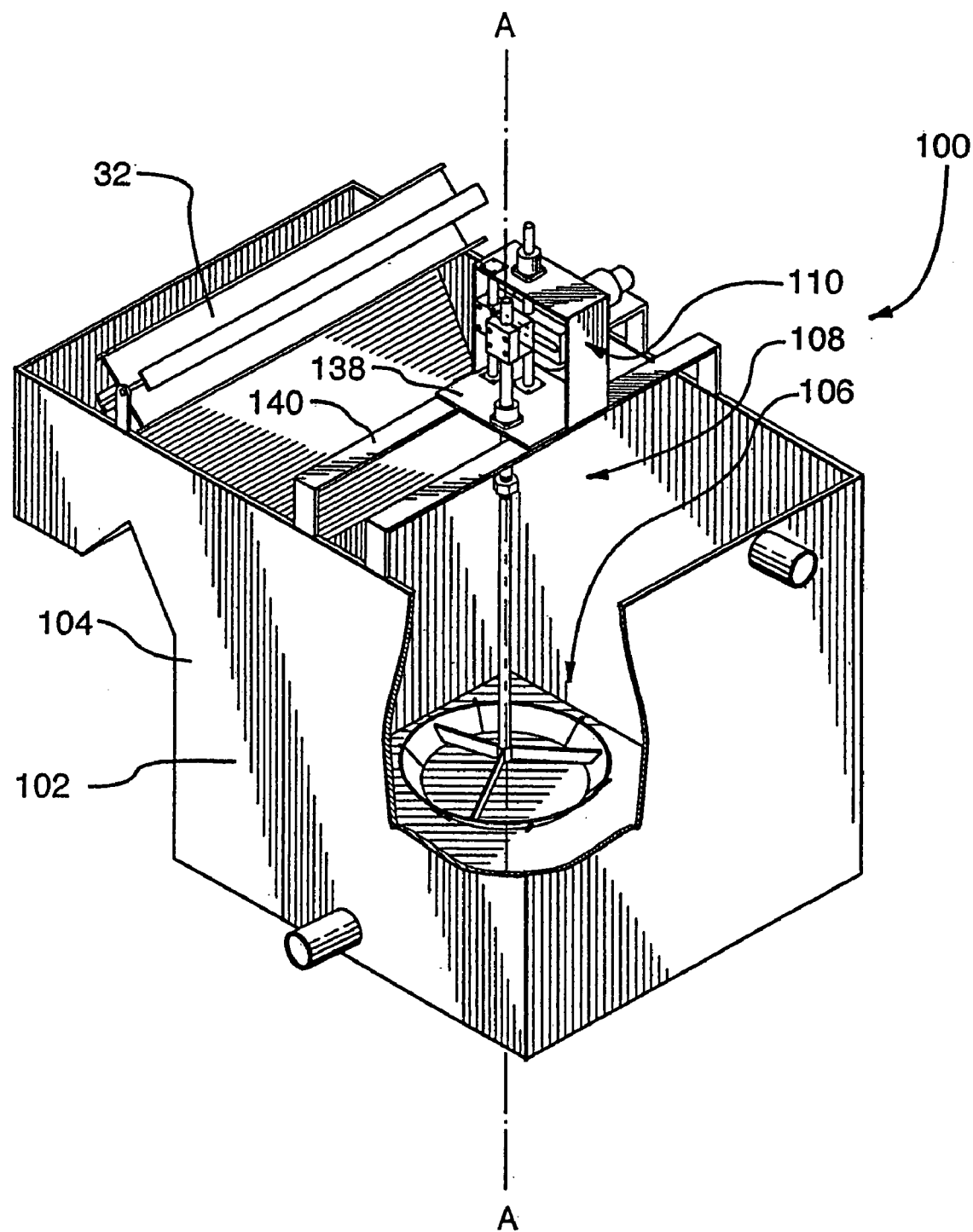
FIG. 14 is a front, top, left side perspective view of a mixing apparatus according to the preferred embodiment of the invention in an alternate use.
Figure 15:
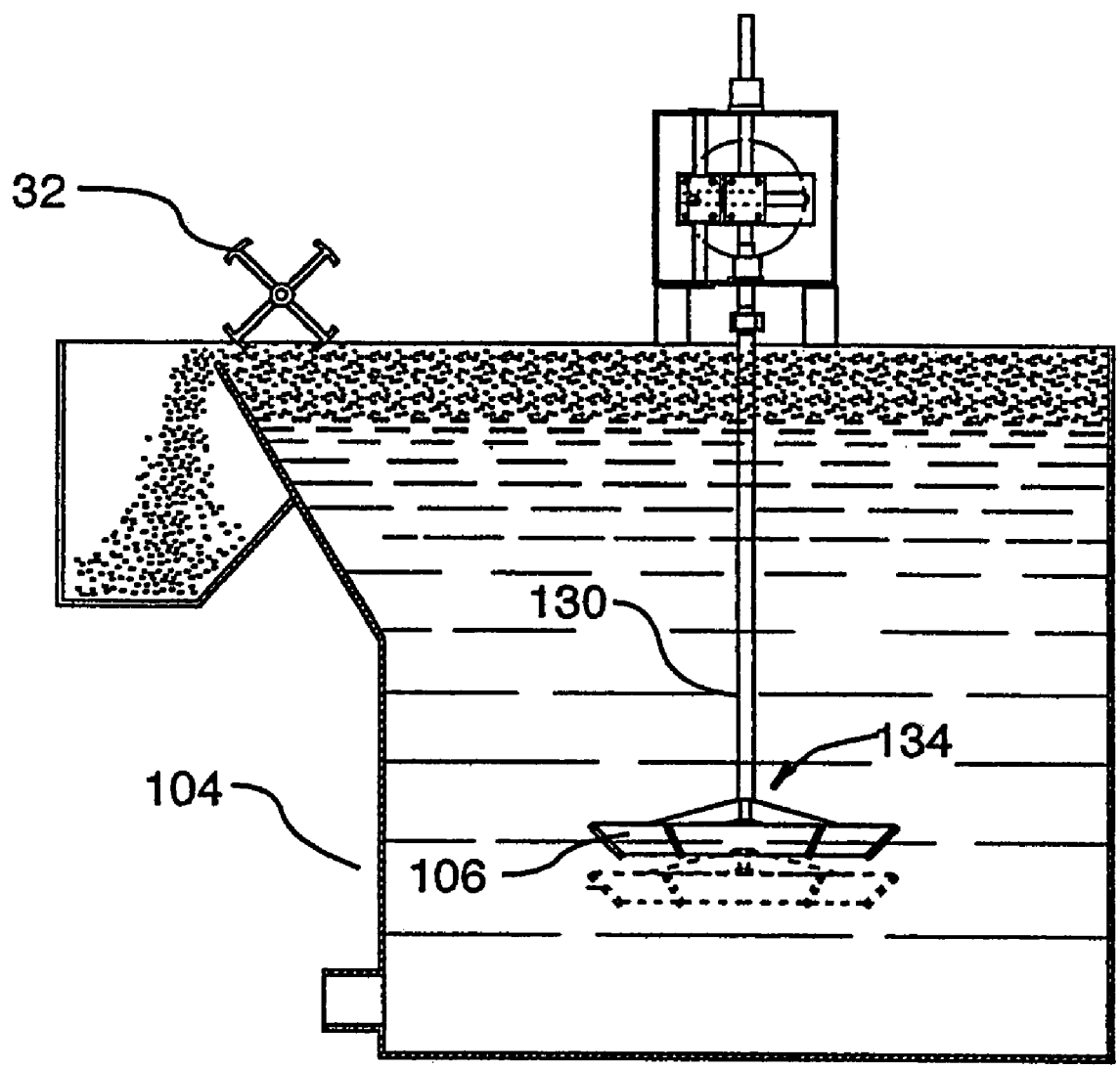
FIG. 15 is a left side cross sectional view of the structure of FIG. 14.

Moreover, it will be evident that the invention may have advantageous utility even outside the SXEW process, in other mixing applications, such as in the context of a froth flotation cell, illustrated in FIGS. 14 and 15, wherein the mixing apparatus is used to agitate a slurry to form a froth, and a paddle mechanism 32 is operatively mounted to the vessel 102 to scour froths produced thereby.

It will, of course, also be understood that various other modifications and alterations may be used in the design and manufacture of the mixing apparatus according to the present invention without departing from its spirit and scope. Accordingly, the scope of the present invention should be understood as limited only by the accompanying claims, purposively construed.

The invention claimed is:

1. A mixing apparatus for use with a vessel having a contiguous sidewall centered about and defining a longitudinal axis, the mixing apparatus comprising:
   a mixing head having a blade portion centered about and defining a head axis and having a first end and a second end, with the second end defining an inside blade diameter "ID" and the first end defining an outer blade diameter "OD";
   mounting means for mounting the mixing head substantially coaxial to and within the vessel for longitudinal movement relative thereto; and
   reciprocating means for effecting said longitudinal relative movement of the mixing head in a reciprocating manner through a stroke length "S", with a duration "T" for each cycle,
   wherein $175 \leq 0.36 \times OD^2/ID^2 \times S/T \leq 250$
   when OD, ID and S are each expressed in inches, and T is expressed in minutes.

2. A mixing apparatus according to claim 1, wherein
   a pair of axes are defined by and coincident with the intersections of the surface of the blade portion and a plane coincident with the head axis; and
   $\alpha = 180$ degrees, wherein angle $\alpha$ is defined by the angle between said pair of axes.

3. A mixing apparatus according to claim 1, wherein the mounting means comprises a mixer shaft, the mixer shaft having a bottom end operatively rigidly connected to the mixing head and extending from said bottom end, substantially parallel to the head axis, to a top end which is disposed above the vessel in use.

4. A mixing apparatus according to claim 3, wherein the reciprocating means comprises shaft gripping means for gripping the mixer shaft adjacent the top end for effecting longitudinal reciprocating movement of the shaft gripping means through stroke length "S" with duration "T" for each cycle, thereby to effect said longitudinal movement of the mixing head in said reciprocating manner.

5. A mixing apparatus according to claim 4, further comprising a housing positionable above said vessel.

6. A mixing apparatus according to claim 5, wherein the reciprocating means comprises:
   a flywheel mounted to the housing for rotation about a rotational axis which is normal to the longitudinal axis;
   a crank member projecting from the flywheel in a direction parallel to the rotational axis and connected to the flywheel for rotation therewith; and
   a yoke displaced from the flywheel in the direction of the crank member and having a substantially linear race formed therein which is in receipt of the crank member and is adapted to permit relative translational movement of the crank member and the yoke, wherein the yoke is positioned with the race arranged normal to the rotation axis and bisected thereby and is mounted to the housing in a manner which constrains movement of the yoke therefrom otherwise than along an axis parallel to the longitudinal axis and normal to the rotational axis such that, during rotation of the flywheel, the crank member imparts longitudinal reciprocating movement to the yoke, and wherein the shaft gripping means is operatively rigidly connected to the yoke for longitudinal reciprocating movement therewith.

7. A mixing apparatus according to claim 6, wherein the reciprocating means includes a drive means for driving said rotation of the flywheel.

8. A mixing apparatus according to claim 7, wherein the drive means is an electric motor.

9. A mixing apparatus according to claim 5, wherein the mounting means further comprises a linear bearing assembly supporting the mixer shaft, in use, for longitudinal movement, the linear bearing assembly so supporting the mixer shaft at a first location, relatively proximal to the shaft gripping means, and at a second location, disposed downwardly from the first location and relatively distal to the shaft gripping means.

10. A mixing apparatus according to claim 9, wherein the linear bearing assembly includes a first portion securely attached to the housing and disposed to one side of the mixer shaft in use and a second portion, disposed to the other side of the mixer shaft in use and operatively removably secured to the housing to permit, when removed, removal and replacement of the mixer shaft.

11. A mixing apparatus according to claim 9, wherein the linear bearing assembly includes a bushing to provide for said support of the mixer shaft at the first location, the bushing being formed of mating bushing blocks which form, respectively, part of the first portion and the second portion of the linear bearing assembly.

12. A mixing apparatus according to claim 11, wherein the linear bearing assembly includes a plurality of rollers arranged to circumferentially surround said mixer shaft in use and thereby to provide for said support of the mixer shaft at the second location, the plurality of rollers being formed of mating roller subassemblies which form, respectively, part of the first portion and the second portion of the linear bearing assembly.

13. A mixing apparatus according to claim 12, wherein the roller subassembly which forms part of the first portion comprises a pair of rollers, and wherein the roller subassembly which forms part of the second portion comprises one roller.

14. A mixing apparatus according to claim 3, wherein the mixer shaft extends from the mixing head substantially coincident with the head axis.

15. A mixing apparatus according to claim 14, wherein the bottom end of the mixer shaft is operatively rigidly connected to the mixing head by a hub member rigidly connected to the bottom end of the mixer shaft and a plurality of support webs extending between and connecting the hub member and the blade portion.

16. A mixing apparatus according to claim 15, wherein the support webs are formed with a plurality of perforations extending therethrough, and with a plurality of tabs, each tab substantially overlying a respective one of the plurality of perforations and being connected to the support web at one edge of said respective one of the plurality of perforations to form a gill.

17. A mixing apparatus according to claim 1, wherein the blade portion has a plurality of dimples projecting therefrom.

18. A mixing apparatus according to claim 1, wherein the blade portion has a plurality of perforations therethrough.

19. Use of the mixing apparatus of claim 1 as a mixer for a vessel in an SXEW extractor unit, the vessel having an internal diameter D and a height H.

20. Use according to claim 19, wherein OD:D is between about 1:2.5 to 1:4 and OD:ID is between about 1.0 to 1.5.

21. Use according to claim 19, wherein D:H is approximately 1:1.

22. Use of the mixing apparatus of claim 1 as a mixer for the vessel in a froth flotation cell.

* * * * *